US012778224B2

(12) United States Patent
Delgado et al.

(10) Patent No.: US 12,778,224 B2
(45) Date of Patent: Nov. 3, 2026

(54) ADDITIVELY MANUFACTURED ARTICLES OF APPAREL

(71) Applicant: adidas AG, Herzogenaurach (DE)

(72) Inventors: Christian Manuel Arias Delgado, Portland, OR (US); Fionn Corcoran-Tadd, Portland, OR (US); Matteo E. Padovani, Portland, OR (US)

(73) Assignee: adidas AG, Herzogenaurach (DE)

( * ) Notice: Subject to any disclaimer, the term of this patent is extended or adjusted under 35 U.S.C. 154(b) by 0 days.

(21) Appl. No.: 19/073,959

(22) Filed: Mar. 7, 2025

(65) Prior Publication Data

US 2026/0262769 A1 Sep. 10, 2026

(51) Int. Cl.

| | |
|---|---|
| ***A41D 19/00*** | (2006.01) |
| ***A41D 19/015*** | (2006.01) |
| *B33Y 80/00* | (2015.01) |

(52) U.S. Cl.

CPC ..... *A41D 19/0006* (2013.01); *A41D 19/0048* (2013.01); *A41D 19/01582* (2013.01); *B33Y 80/00* (2014.12)

(58) Field of Classification Search

CPC ........ A42B 23/0235; A42B 13/12; A42B 7/34; A63B 71/143; B33Y 80/00

See application file for complete search history.

(56) References Cited

U.S. PATENT DOCUMENTS

| | | | |
|---|---|---|---|
| 354,693 | A | 12/1886 | Dick |
| 1,111,437 | A | 9/1914 | Butterfield |
| 2,205,356 | A | 6/1940 | Rose et al. |
| 2,853,809 | A | 9/1958 | Carlo |
| 3,253,601 | A | 5/1966 | Scholl |
| 3,416,174 | A | 12/1968 | Novitske |
| 3,793,750 | A | 2/1974 | Bowerman |
| 4,012,855 | A | 3/1977 | Gardner |
| 4,271,606 | A | 6/1981 | Rudy |

(Continued)

FOREIGN PATENT DOCUMENTS

| | | | |
|---|---|---|---|
| CN | 101611953 | A | 12/2009 |
| CN | 102578760 | A | 7/2012 |

(Continued)

OTHER PUBLICATIONS

"Adidas Breaks the Mould With 3D-Printed Performance Footwear," Adidas Group, [Retrieved on Oct. 7, 2015], Retrieved from the Internet: ( http://www.adidas-group.com/en/media/news-archive/press-releases/2015/adi-das-breaks-mould-3d-printed-performance-footwear/ ).

(Continued)

*Primary Examiner* — Katherine M Moran

(74) *Attorney, Agent, or Firm* — Sterne, Kessler, Goldstein & Fox P.L.L.C.

(57) ABSTRACT

Articles of apparel comprising an outer skin, an inner skin, and a core disposed between the outer skin. The outer skin, the inner skin, and the core can be integrally formed. Features of the outer skin, inner skin, and/or core can be manufactured to provide desired properties for the article of apparel, for example cushioning properties, force redirecting properties, air flow properties, and gripping properties. In some embodiments, the article of apparel comprises a glove.

4 Claims, 16 Drawing Sheets

(56) References Cited

U.S. PATENT DOCUMENTS

| | | | |
|---|---|---|---|
| 4,297,796 | A | 11/1981 | Stirtz et al. |
| 4,309,831 | A | 1/1982 | Pritt |
| 4,378,643 | A | 4/1983 | Johnson |
| 4,439,936 | A | 4/1984 | Clarke et al. |
| 4,607,440 | A | 8/1986 | Roberts et al. |
| 4,774,774 | A | 10/1988 | Allen, Jr. |
| 5,236,637 | A | 8/1993 | Hull |
| 5,337,492 | A | 8/1994 | Anderie et al. |
| 5,367,791 | A | 11/1994 | Gross et al. |
| 5,391,072 | A | 2/1995 | Lawton et al. |
| 5,423,135 | A | 6/1995 | Poole et al. |
| 5,529,473 | A | 6/1996 | Lawton et al. |
| 5,799,417 | A | 9/1998 | Burke et al. |
| 5,862,614 | A | 1/1999 | Koh |
| 5,930,916 | A | 8/1999 | Connor |
| 5,983,529 | A | 11/1999 | Serna |
| 5,985,383 | A | 11/1999 | Allen et al. |
| 6,014,821 | A | 1/2000 | Yaw |
| 6,021,588 | A | 2/2000 | Alviso |
| 6,076,283 | A | 6/2000 | Boie |
| 6,259,962 | B1 | 7/2001 | Gothait |
| 6,367,172 | B2 | 4/2002 | Hernandez |
| 6,665,958 | B2 | 12/2003 | Goodwin |
| 6,763,611 | B1 | 7/2004 | Fusco |
| 7,383,647 | B2 | 6/2008 | Chan et al. |
| 7,438,846 | B2 | 10/2008 | John |
| 7,676,955 | B2 | 3/2010 | Dojan et al. |
| 7,704,430 | B2 | 4/2010 | Johnson et al. |
| 7,892,474 | B2 | 2/2011 | Shkolnik et al. |
| 8,110,135 | B2 | 2/2012 | El-Siblani |
| 8,191,284 | B2 | 6/2012 | Cho |
| 8,522,454 | B2 | 9/2013 | Schindler et al. |
| 8,739,639 | B2 | 6/2014 | Owings et al. |
| 8,776,396 | B2 | 7/2014 | Huynh |
| 9,205,601 | B2 | 12/2015 | DeSimone et al. |
| 9,211,678 | B2 | 12/2015 | DeSimone et al. |
| 9,216,546 | B2 | 12/2015 | DeSimone et al. |
| 9,320,316 | B2 | 4/2016 | Guyan et al. |
| 9,453,142 | B2 | 9/2016 | Rolland et al. |
| D789,060 | S | 6/2017 | Guyan et al. |
| 9,756,899 | B2 | 9/2017 | Waatti |
| D809,752 | S | 2/2018 | Campbell |
| 9,930,929 | B2 | 4/2018 | Cooper et al. |
| 10,010,133 | B2 | 7/2018 | Guyan |
| 10,010,134 | B2 | 7/2018 | Guyan |
| 10,016,013 | B2 | 7/2018 | Kormann et al. |
| 10,034,516 | B2 | 7/2018 | Gheorghian et al. |
| 10,039,343 | B2 | 8/2018 | Guyan |
| D829,425 | S | 10/2018 | Albrecht et al. |
| D831,315 | S | 10/2018 | Mahoney |
| 10,104,934 | B2 | 10/2018 | Guyan |
| D841,300 | S | 2/2019 | Albrecht et al. |
| D841,301 | S | 2/2019 | Albrecht et al. |
| 10,231,511 | B2 | 3/2019 | Guyan et al. |
| 10,259,171 | B2 | 4/2019 | Robeson et al. |
| D847,481 | S | 5/2019 | Albrecht et al. |
| D857,362 | S | 8/2019 | Thompson |
| D859,801 | S | 9/2019 | Jenkins et al. |
| D862,051 | S | 10/2019 | Goussev et al. |
| D862,866 | S | 10/2019 | Albrecht et al. |
| 10,426,226 | B2 | 10/2019 | Guyan et al. |
| 10,434,706 | B2 | 10/2019 | Robeson et al. |
| D873,546 | S | 1/2020 | Henrichot |
| D876,056 | S | 2/2020 | Henrichot |
| D878,016 | S | 3/2020 | Henrichot |
| D879,428 | S | 3/2020 | Braun et al. |
| D879,434 | S | 3/2020 | Fick et al. |
| 10,575,588 | B2 | 3/2020 | Perrault et al. |
| D880,120 | S | 4/2020 | Fick et al. |
| D880,122 | S | 4/2020 | Fick et al. |
| D880,131 | S | 4/2020 | Fick et al. |
| D882,227 | S | 4/2020 | Braun et al. |
| 10,639,861 | B2 | 5/2020 | Minh et al. |
| D890,485 | S | 7/2020 | Perrault et al. |
| 10,806,208 | B2 | 10/2020 | Büsgen et al. |
| D907,904 | S | 1/2021 | Perrault et al. |
| 11,304,471 | B2 * | 4/2022 | Light ........................ A42B 3/10 |
| 11,864,610 | B2 * | 1/2024 | Goulet ................ A41D 31/285 |
| 2002/0078598 | A1 | 6/2002 | Bell |
| 2004/0087230 | A1 | 5/2004 | Wildeman |
| 2006/0201028 | A1 | 9/2006 | Chan et al. |
| 2007/0011914 | A1 | 1/2007 | Keen et al. |
| 2007/0043582 | A1 | 2/2007 | Peveto et al. |
| 2008/0289218 | A1 | 11/2008 | Nakano |
| 2009/0013556 | A1 | 1/2009 | Nishiwaki et al. |
| 2009/0126225 | A1 | 5/2009 | Jarvis |
| 2009/0139112 | A1 | 6/2009 | Garneau |
| 2009/0183392 | A1 | 7/2009 | Shane |
| 2009/0293309 | A1 | 12/2009 | Keating et al. |
| 2010/0122471 | A1 | 5/2010 | Edington et al. |
| 2010/0170106 | A1 | 7/2010 | Brewer et al. |
| 2010/0199520 | A1 | 8/2010 | Dua et al. |
| 2010/0251565 | A1 | 10/2010 | Litchfield et al. |
| 2010/0281714 | A1 | 11/2010 | Carboy et al. |
| 2011/0099855 | A1 | 5/2011 | Cho |
| 2012/0117825 | A9 | 5/2012 | Jarvis |
| 2012/0178259 | A1 | 7/2012 | Miyazaki et al. |
| 2012/0180335 | A1 | 7/2012 | Mahoney |
| 2012/0186107 | A1 | 7/2012 | Crary et al. |
| 2013/0118036 | A1 | 5/2013 | Gibson |
| 2013/0145653 | A1 | 6/2013 | Bradford |
| 2013/0171019 | A1 | 7/2013 | Gessler et al. |
| 2013/0292862 | A1 | 11/2013 | Joyce |
| 2013/0295212 | A1 | 11/2013 | Chen et al. |
| 2014/0020191 | A1 | 1/2014 | Jones et al. |
| 2014/0026773 | A1 | 1/2014 | Miller |
| 2014/0029030 | A1 | 1/2014 | Miller |
| 2014/0109441 | A1 | 4/2014 | McDowell et al. |
| 2014/0150297 | A1 | 6/2014 | Holmes et al. |
| 2014/0182170 | A1 | 7/2014 | Wawrousek et al. |
| 2014/0223783 | A1 | 8/2014 | Wardlaw et al. |
| 2014/0226773 | A1 | 8/2014 | Toth et al. |
| 2014/0259779 | A1 | 9/2014 | Hashish et al. |
| 2014/0259787 | A1 | 9/2014 | Guyan et al. |
| 2014/0259788 | A1 | 9/2014 | Dojan et al. |
| 2014/0259789 | A1 | 9/2014 | Dojan et al. |
| 2014/0299009 | A1 | 10/2014 | Miller et al. |
| 2014/0300675 | A1 | 10/2014 | Miller et al. |
| 2014/0300676 | A1 | 10/2014 | Miller et al. |
| 2014/0310991 | A1 | 10/2014 | Greene et al. |
| 2015/0000161 | A1 | 1/2015 | Peyton et al. |
| 2015/0033577 | A1 | 2/2015 | Dahl et al. |
| 2015/0033579 | A1 | 2/2015 | Barnes et al. |
| 2015/0033581 | A1 | 2/2015 | Barnes et al. |
| 2015/0089841 | A1 | 4/2015 | Smaldone et al. |
| 2015/0128448 | A1 | 5/2015 | Lockyer |
| 2015/0181976 | A1 | 7/2015 | Cooper et al. |
| 2015/0223560 | A1 | 8/2015 | Wawrousek et al. |
| 2015/0245686 | A1 | 9/2015 | Cross |
| 2015/0331402 | A1 | 11/2015 | Lin et al. |
| 2015/0351493 | A1 | 12/2015 | Ashcroft et al. |
| 2015/0360419 | A1 | 12/2015 | Willis et al. |
| 2016/0051009 | A1 | 2/2016 | Kormann et al. |
| 2016/0122493 | A1 | 5/2016 | Farris et al. |
| 2016/0137839 | A1 | 5/2016 | Rolland et al. |
| 2016/0160077 | A1 | 6/2016 | Rolland et al. |
| 2016/0180440 | A1 | 6/2016 | Dibenedetto et al. |
| 2016/0288376 | A1 | 10/2016 | Sun et al. |
| 2016/0295971 | A1 | 10/2016 | Arnese et al. |
| 2016/0324260 | A1 | 11/2016 | Guyan |
| 2016/0324261 | A1 | 11/2016 | Guyan |
| 2016/0346626 | A1 | 12/2016 | Nürnberg et al. |
| 2016/0360828 | A1 | 12/2016 | Guyan |
| 2016/0374428 | A1 | 12/2016 | Kormann et al. |
| 2017/0129167 | A1 | 5/2017 | Castanon |
| 2017/0129169 | A1 | 5/2017 | Batchelder et al. |
| 2017/0150778 | A1 | 6/2017 | Youngs et al. |
| 2017/0360156 | A1 | 12/2017 | Lussier |
| 2018/0014606 | A1 | 1/2018 | Mokos |
| 2018/0070736 | A1 | 3/2018 | Achten et al. |
| 2018/0103719 | A1 | 4/2018 | Chen |
| 2018/0126630 | A1 | 5/2018 | Panzer et al. |
| 2018/0243976 | A1 | 8/2018 | Feller |
| 2018/0271211 | A1 | 9/2018 | Perrault et al. |

(56) References Cited

U.S. PATENT DOCUMENTS

| | | | |
|---|---|---|---|
| 2018/0271213 | A1 | 9/2018 | Perrault et al. |
| 2018/0290374 | A1 | 10/2018 | Willis et al. |
| 2018/0368518 | A1 | 12/2018 | Re et al. |
| 2019/0069632 | A1 | 3/2019 | Meschter |
| 2019/0098960 | A1 | 4/2019 | Weisskopf et al. |
| 2019/0125004 | A1 | 5/2019 | Thomas et al. |
| 2019/0160733 | A1 | 5/2019 | Mirkin et al. |
| 2019/0216174 | A1 | 7/2019 | O'Haire et al. |
| 2019/0223543 | A1 | 7/2019 | Tamm et al. |
| 2019/0223551 | A1 | 7/2019 | Hoffer et al. |
| 2019/0269200 | A1 | 9/2019 | Tseng |
| 2019/0289960 | A1 | 9/2019 | Loveder |
| 2019/0307207 | A1 | 10/2019 | Braithwaite et al. |
| 2020/0093221 | A1 | 3/2020 | Caldwell et al. |
| 2020/0156308 | A1 | 5/2020 | Ramos et al. |
| 2020/0329815 | A1 | 10/2020 | Schmid |
| 2021/0195989 | A1 | 7/2021 | Iwasa et al. |
| 2021/0195995 | A1 | 7/2021 | Sakamoto et al. |
| 2021/0197494 | A1 | 7/2021 | Zhu et al. |
| 2022/0110406 | A1 | 4/2022 | Salari-Sharif et al. |
| 2022/0110407 | A1 | 4/2022 | Hettinga et al. |
| 2022/0110408 | A1 | 4/2022 | Coonrod et al. |
| 2022/0264997 | A1 | 8/2022 | Hatano et al. |
| 2023/0046685 | A1 | 2/2023 | Sussmann |
| 2023/0080887 | A1 | 3/2023 | Jawaid |
| 2024/0032649 | A1 | 2/2024 | Corcoran-Tadd et al. |
| 2024/0245165 | A1 | 7/2024 | Chen |
| 2024/0365922 | A1 | 11/2024 | Salari-Sharif et al. |
| 2024/0389689 | A1 * | 11/2024 | Schmidt ............... A41D 19/015 |

FOREIGN PATENT DOCUMENTS

| | | | |
|---|---|---|---|
| CN | 203378623 | U | 1/2014 |
| CN | 209391169 | U | 9/2019 |
| CN | 209403686 | U | 9/2019 |
| CN | 110859355 | A | 3/2020 |
| EP | 0526892 | A2 | 2/1993 |
| EP | 2564719 | A1 | 3/2013 |
| EP | 2424398 | B1 | 12/2015 |
| EP | 3013171 | A1 | 5/2016 |
| EP | 3165109 | A1 | 5/2017 |
| EP | 2564714 | B1 | 7/2018 |
| EP | 3939462 | A2 | 1/2022 |
| ES | 2442448 | A1 | 2/2014 |
| ES | 2578730 | A1 | 7/2016 |
| JP | 3192899 | B2 | 7/2001 |
| JP | 2002238609 | A | 8/2002 |
| JP | 2011251190 | A | 12/2011 |
| JP | 2014151201 | A | 8/2014 |
| JP | 3192899 | U | 9/2014 |
| WO | WO-2010126708 | A2 | 11/2010 |
| WO | WO-2014008331 | A2 | 1/2014 |
| WO | WO-2014009587 | A1 | 1/2014 |
| WO | WO-2014015037 | A2 | 1/2014 |
| WO | WO-2014100462 | A1 | 6/2014 |
| WO | WO-2015164234 | A1 | 10/2015 |
| WO | WO-2015169941 | A1 | 11/2015 |
| WO | WO-2015169942 | A1 | 11/2015 |
| WO | WO-2016066750 | A1 | 5/2016 |
| WO | WO-2017210298 | A1 | 12/2017 |
| WO | WO-2021169804 | A1 | 9/2021 |

OTHER PUBLICATIONS

Green, D., Adidas is finally bringing 3D-printed shoes into the mainstream, Business Insider.com, Dennis Green, Retrieved from the Internet: (URL:https://www.businessinsider.com/adidas-releases-futurecraft-4d-shoe-2017-4/commerce-on-business-insider), (Year: 2017).

Worman, C., Top Tennis Shoes Featuring a 6-Month Outsole Warranty, Retrieved from the Internet (URL: https://blogs.tennisexpress.com/blogs/top-tennis-shoes-featuring- -a-6-month-outsole-warranty/ ), (Year: 2018), 11 pages.

Janusziewicz, R., et al., "Layerless Fabrication With Continuous Liquid Interface Production," Proceedings of the National Academy of Sciences of the United States of America 113(42):11703-11708, National Academy of Sciences, United States (Oct. 2016).

Nikolic, I., Reebok Flexagon Training Shoes, Behance.net, Ilija Nikolic, Retrieved from the Internet (URL: https://www.behance.net/gallery/68953047/REEBOK-FLEXAGON-Training-Shoes?t- racking_source=curated_galleries_list) 2018, 10 pages.

Panetta., et al., "Elastic Textures for Additive Fabrication," ACM Transactions on Graphics 34(4), Article No. 135 (Aug. 2015).

Pearson, D., adidas is giving Olympic athletes its first-ever 3D-printed shoes, Highsnobiety.com, Retrieved from the Internet: (URL:https://www.highsnobiety.com/2016/08/11/adidas-3d-printed-shoes-olympics/ ), (Year: 2016).

Reebok Flexagon, Retrieved from the Internet (URL: https://www.reebok.com/us/reebok-flexagon/CN2583.html), 2018.

Richard, B., Here's what 3D printed Future Craft adidas Yeezy boosts would look like Yeezys geared up for the future Retrieved from the Internet: (URL:https://solecollector.com/news/2015/11/adidas-yeezy-futurecraft-3d-print), (Year: 2015).

Tumbleston, J.R., et al., "Continuous Liquid Interface Production of 3d Objects," Science 347(6228):1349-1352, American Association for the Advancement of Science, United States (Mar. 2015).

* cited by examiner

ADDITIVELY MANUFACTURED ARTICLES OF APPAREL

TECHNICAL FIELD

The present disclosure relates to additively manufactured articles of apparel. In particular embodiments, the present disclosure relates to additively manufactured gloves.

BACKGROUND

When designing articles of apparel, for example a glove, to be used for participation in athletic activities, the use of the apparel when engaging in those activities should be considered. For example, securing a glove to the hand of the user can reduce undesired movement of the glove on the hand of the user. As another example, breathability of the glove can reduce odors caused by sweat. As yet another example, the ability to maintaining glove function while increasing protection of the hand of the user can also be considered. Hence, there is a continuing need for articles of apparel, for example gloves designed to improve the overall properties of the apparel.

BRIEF SUMMARY

A first embodiment (I) of the present disclosure is directed to a glove comprising a palm portion; and finger portions extending from the palm portion, the finger portions comprising: an outer skin; an inner skin; and a core disposed between the outer skin and the inner skin and extending from the inner skin and toward the outer skin, wherein the core comprises unit cells and each unit cell comprises: unit cell struts defining a three-dimensional structure, and nodes at which the unit cell struts are connected; wherein the outer skin, the inner skin, and the core are integrally formed.

In a second embodiment (II), in the glove of the first embodiment (I), the unit cells and the outer skin define grooves that separate the finger portions into segments that are configured to move away from each other when the finger portions bend toward the palm portion and move toward each other when the finger portions extend away from the palm portion.

In a third embodiment (III), in the glove of the second embodiment (II), the segments are configured to contact each other to limit extension of the finger portions away from the palm portion.

In a fourth embodiment (IV), in the glove according to any one of embodiments (I)-(IV), the unit cells define a channel extending through the core and along a length of at least one of the finger portions, and the at least one of the finger portions comprises a rod disposed in the channel, the rod configured to limit extension of the at least one of the finger portions away from the palm portion.

In a fifth embodiment (V), in the glove of the fourth embodiment (IV), the rod extends from a base coupled to the wrist portion.

In a sixth embodiment (VI), in the glove according to any one of embodiments (I)-(V), the finger portions comprise rod portions and joint portions, wherein the rod portions comprise the outer skin, the inner skin, and the core, and wherein the joint portions comprise the outer skin and the inner skin and do not comprise the core.

In a seventh embodiment (VII), in the glove of the sixth embodiment (VI), the rod portions are thicker than the joint portions.

In an eighth embodiment (VIII), in the glove according to any one of embodiments (I)-(VII), the outer skin defines a palm portion and a back portion of the glove, and the core comprises a first core section extending from the palm portion and a second core section extending from the back portion, the first core section comprises a first group of unit cells defining a first three-dimensional mesh and the second core section comprises a second group of unit cells defining a second three-dimensional mesh, and the second three-dimensional mesh is denser than the first three-dimensional mesh.

In a ninth embodiment (IX), in the glove of according to one of embodiments (I)-(VIII), at least one of the finger portions or the palm portion defines openings that allow air to enter and exit the glove.

In a tenth embodiment (X), in the glove of the ninth embodiment (IX), the openings comprise an outer opening in the outer skin and an inner opening in the inner skin, wherein the outer opening and the inner opening are in fluid communication with each other to allow air to enter and exit the glove.

In an eleventh embodiment (XI), in the glove according to any one of embodiments (I)-(X), the outer skin comprises suction cups extending away from the finger portions.

In a twelfth embodiment (XII), in the glove according to any one of embodiments (I)-(XI), the palm portion comprises suction cups that are integrally formed with the palm portion, the suction cups extending away from an outer surface of the palm portion.

In a thirteenth embodiment (XIII), the glove according to any one of embodiments (I)-(XII) comprises an attachment portion extending from the wrist portion, the attachment portion comprising a first set of connectors and the wrist portion comprising a second set of connectors, the first set of connectors and the second set of connectors configured to connect to adjust a fit of the glove around a wrist of a user, wherein the attachment portion and the wrist portion are integrally formed.

In a fourteenth embodiment (XIV), in the glove according to any one of embodiments (I)-(XIII), the outer skin comprises a surface texture.

A fifteenth embodiment (XV) of the present disclosure is directed to an article of apparel, comprising: an additively manufactured outer skin; an additively manufactured inner skin located opposite the additively manufactured outer skin; and an additively manufactured core extending between the additively manufactured outer skin and the additively manufactured inner skin, wherein the additively manufactured core comprises a three-dimensional mesh comprising unit cells, each unit cell comprising unit cell struts defining a three-dimensional structure and nodes at which one or more unit cell struts are connected, wherein the unit cell struts comprise a plurality of first unit cell struts and a plurality of second unit cell struts, the second unit cell struts being stiffer than the first unit cell struts, and wherein the plurality of first unit cell struts and the plurality of second unit cell struts are arranged such that the additively manufactured core is configured to deform radially inward when a force is imparted to the additively manufactured core.

In a sixteenth embodiment (XVI), in the article of apparel of the fifteenth embodiment (XV), the additively manufactured core is configured to deform toward a central portion of the article of apparel.

In a seventeenth embodiment (XVII), in the article of apparel according to any one of embodiments (XV)-(XVI), the article of apparel comprises a glove and the additively manufactured core is configured to deform toward a center of a palm portion of the glove.

In an eighteenth embodiment (XVIII), in the article of apparel according to any one of embodiments (XV)-(XVII), a cross-sectional area of the article of apparel increases when the force is imparted to the additively manufactured core.

In a nineteenth embodiment (XIX), the article of apparel according to the seventeenth embodiment (XVII) comprises a projection extending from the additively manufactured outer skin, wherein the projection is configured to move away from a central portion of the article of apparel when the force is imparted to the additively manufactured core.

In a twentieth embodiment (XX), in the article of apparel according to any one of embodiments (XV)-(XIX), the additively manufactured outer skin comprises a coating applied to the additively manufactured outer skin.

In a twenty-first embodiment (XXI), the article of apparel according to any one of embodiments (XV)-(XX) comprises an adjuster extending from the additively manufactured outer skin, the additively manufactured inner skin, or the additively manufactured core, wherein the adjuster is configured to move one or more of the additively manufactured outer skin, the additively manufactured inner skin, or the additively manufactured core relative to each other to tighten or loosen the article of apparel.

In a twenty-second embodiment (XXII), in the article of apparel according to any one of embodiments (XV)-(XXI), the additively manufactured core comprises exposed struts, wherein each of the exposed struts comprises a free end, the free end comprising a stem that extends from the free end at a nonzero angle relative to the exposed strut.

In a twenty-third embodiment (XXIII), in article of apparel of the twenty-second embodiment (XXII), the exposed struts extend from the unit cell struts and extend through the additively manufactured outer skin.

In a twenty-fourth embodiment (XXIV), in the article of apparel according to any one of embodiments (XXII)-(XXIII), a portion of the article of apparel does not comprise the additively manufactured outer skin, and wherein the exposed struts are located in the portion of the article of apparel that does not comprise the additively manufactured outer skin.

In a twenty-fifth embodiment (XXV), in the article of apparel according to any one of embodiments (XXII)-(XXIV), the free end extends radially inward toward a central portion of the article of apparel.

In a twenty-sixth embodiment (XXVI), in the article of apparel according to any one of embodiments (XXII)-(XXV), the force imparted to the additively manufactured core causes the exposed struts to move toward a central portion of the article of apparel.

A twenty-seventh embodiment (XXVII) of the present disclosure is directed to an article of apparel, comprising: an outer skin; an inner skin; and a core disposed between the outer skin and the inner skin and extending from the inner skin and toward the outer skin, wherein the article of apparel comprises a first configuration in which the core is covered by the outer skin and a second configuration in which a portion of the core extends through the outer skin or the inner skin.

In a twenty-eighth embodiment (XXVIII), in the article of apparel of the twenty-seventh embodiment (XXVII), a force applied to the outer skin and directed at least partially toward the inner skin causes the article of apparel to move from the first configuration to the second configuration when the force is greater than a threshold value.

In a twenty-ninth embodiment (XXIX), in the article of apparel of any one of embodiments (XXVII)-(XXVIII), the core comprises posts extending from the inner skin, and the outer skin defines openings corresponding to the posts such that the posts extend through the openings in the second configuration.

In a thirtieth embodiment (XXX), in the article of apparel of any one of embodiments (XXVII)-(XXVIII), the core comprises posts extending from the outer skin, and the inner skin defines openings corresponding to the posts such that the posts extend through the openings in the second configuration.

BRIEF DESCRIPTION OF THE DRAWINGS/FIGURES

DETAILED DESCRIPTION

Figure 1A:
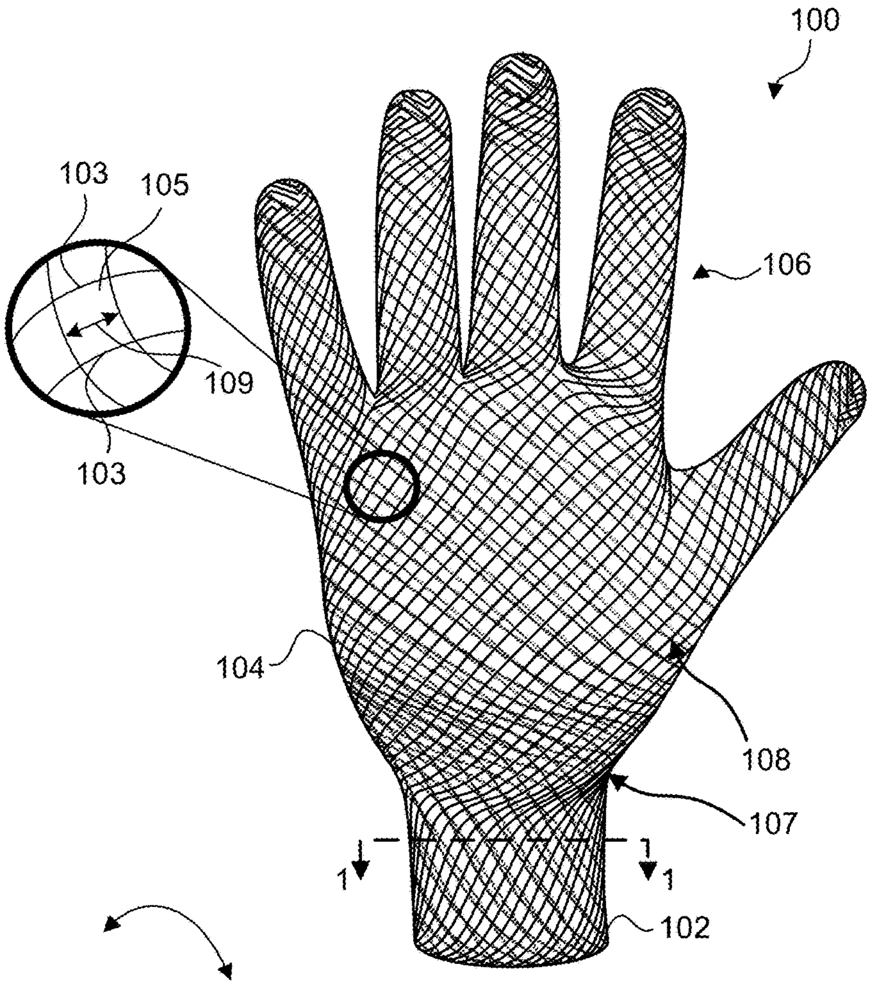
FIG. 1A shows a glove, according to some embodiments.

The indefinite articles “a,” “an,” and “the” include plural referents unless clearly contradicted or the context clearly dictates otherwise.

As used herein, unless specified otherwise, references to “first,” “second,” “third,” “fourth,” etc. are not intended to denote order, or that an earlier-numbered feature is required for a later-numbered feature. Also, unless specified otherwise, the use of “first,” “second,” “third,” “fourth,” etc. does not necessarily mean that the "first," "second," "third," "fourth," etc. features have different properties or values.

As used herein, unless specified otherwise, reference to two or more values being "approximately equal" refers to instances in which the two or more values are equal or within 10 percent of being equal. For example, values between 9 and 11 are considered approximately equal to a stated value of 10.

The term "comprising" is an open-ended transitional phrase. A list of elements following the transitional phrase "comprising" is a non-exclusive list, such that elements in addition to those specifically recited in the list can also be present. The phrase "consisting essentially of" limits the composition of a component to the specified materials and those that do not materially affect the basic and novel characteristic(s) of the component. The phrase "consisting of" limits the composition of a component to the specified materials and excludes any material not specified.

Where a range of numerical values comprising upper and lower values is recited herein, unless otherwise stated in specific circumstances, the range is intended to include the endpoints thereof, and all integers and fractions within the range. It is not intended that the disclosure or claims be limited to the specific values recited when defining a range. Further, when an amount, concentration, or other value or parameter is given as a range, one or more ranges, or as list of upper values and lower values, this is to be understood as specifically disclosing all ranges formed from any pair of any upper range limit or value and any lower range limit or value, regardless of whether such pairs are separately disclosed.

Conventional gloves used for athletic activities can provide some advantages for a user during an athletic activity. However, conventional gloves also have some disadvantages. For example, conventional gloves can be secured to the hand of the user at the wrist, thereby allowing relative movement between the remaining portions of the glove and the hand of the user. Conventional gloves can also trap sweat from the user, causing unpleasant odors. Additionally, trapped sweat and/or other moisture can affect the fit of the glove on the hand of the user by allowing the glove to slip relative to the hand. Some conventional gloves can provide additional protection at specific portions of the gloves, however the overall performance and function of the gloves can be negatively impacted by the additional protection.

Articles of apparel, for example gloves according to embodiments of the present application, are designed to provide various advantageous effects for a user. The gloves can facilitate increased athletic performance for a wearer participating in a sport, for example football, American football, hockey, baseball, or any other type of sport in which the user can wear a glove.

As used herein, "apparel" can be any item that is worn or adorns an individual, including both clothing and accessories. Clothing can comprise, but is not limited to pants, shorts, leggings, socks, a shoe (which can refer any type of footwear, including a sneaker, a cleat, a boot, a slipper, a flip-flop, a sandal, etc.), a shoe upper, a shoe sole, a jacket, a coat, a hat, a sleeve, a sweater, a shirt, a bra, a jersey, a bootie, a glove, an arm sleeve, a knee sleeve, an elbow sleeve, a wrist sleeve, an ankle sleeve. Accessories can comprise, but are not limited to a headband, a waistband, a belt, a wristband, a bracelet, a watch band, a shoulder wrap, a tape, a shin guard, a hat, a tie, a scarf, a purse, a handbag, a wallet, a knapsack, or a backpack. While various embodiments are discussed herein in the context of gloves, features of the embodiments can be applied to other articles of apparel, or portions thereof.

Gloves according to embodiments of the present application are designed to at least partially address and/or pursue these problems with conventional gloves and to provide various advantageous effects for a user. In particular, gloves according to embodiments of the present application can provide one or more of the following advantageous effects. In some embodiments, the gloves can provide additional support in particular areas of the glove to at least partially absorb an impact force. In some embodiments, the gloves can be configured to redirect a force imparted to the gloves in a first direction such that the force is redirected in a second direction. In some embodiments, the gloves can be configured to facilitate bending of the certain portions of the gloves and limit bending of other portions of the gloves. In some embodiments, the gloves can be configured to extend and/or change shape in response to a force imparted to the glove. In some embodiments, the gloves can facilitate airflow through the gloves. In some embodiments, the gloves can comprise surface features or textures. In some embodiments, the gloves can be configured to conform to the hand of the user. In some embodiments, any of the gloves described herein can be easily disinfected. For example, gloves comprising a lattice structure and/or a three-dimensional mesh can be immersed in or sprayed with a disinfectant and subsequently dried in an ambient environment or by forced air (for example, a dryer).

FIG. 1A shows a glove 100, according to some embodiments. In some embodiments, the glove 100 can comprise a glove used for athletic competition. For example, the glove 100 can comprise an athletic glove used for football, American football, hockey, baseball, softball, etc. Glove 100 can comprise any combination of structures or features described herein. For example, glove 100 can comprise one or more features of glove 300, glove 400, glove 500, glove 600, glove 700, glove 800, glove 900, glove 1000, glove 1300, glove 1400, and/or glove 1500. In some embodiments, glove 100 can additionally or alternatively comprise one or more portions 1123 as described in connection with FIG. 10, one or more portions 1235 as described in connection with FIGS. 11A-11B, or a combination thereof. For example, glove 100 can comprise unit cells that expand or contract auxetically as described herein for glove 700, an adjuster for tightening or loosening the glove 100 as described for glove 1300, openings to allow for air flow as described for glove 800, joints or stiffeners to aid with flexion and extension as described for glove 300, glove 400, or glove 500, and/or a surface texture as described for glove 900.

The glove 100 can comprise a wrist portion 102, a central portion 104, and finger portions 106. In some embodiments, the wrist portion 102, the central portion 104, and the finger portions 106 can be integrally formed as a single part. Examples of manufacturing techniques that can be used to form components in the form of a single, integral part comprise molding, casting, and additive manufacturing (three-dimensional (3-D) printing). In some embodiments, the wrist portion 102 can comprise a braided 3-D printed structure (for example, the wrist portion 102 can comprise strands of 3-D printed structures that can be braided together to form the wrist portion 102). Accordingly, any component or portion of gloves described herein can be an integrally formed glove part that connects to one or more other integrally formed glove parts as described herein. In some embodiments, any of the gloves described herein can comprise a pre-formed shape such that the hand of the user takes the preformed shape when the user is wearing the glove and the hand is at rest. For example, any of the gloves described herein can comprise a shape in which one or more of the fingers are flexed toward the palm portion, away from the palm portion, or a combination thereof.

Exemplary additive manufacturing techniques include for example, selective laser sintering, selective laser melting, selective heat sintering, stereo lithography, fused deposition modeling, or 3-D printing in general. Various additive manufacturing techniques related to articles of footwear are described for example in US 2009/0126225, WO 2010/126708, US 2014/0300676, US 2014/0300675, US 2014/0299009, US 2014/0026773, US 2014/0029030, WO 2014/008331, WO 2014/015037, US 2014/0020191, EP 2564719, EP 2424398, and US 2012/0117825. In some embodiments, the additive manufacturing process can include a continuous liquid interface production process. For example, the additive manufacturing process can include a continuous liquid interface production process as described in U.S. Pat. No. 9,453,142, issued on Sep. 27, 2016, which is hereby incorporated in its entirety by reference thereto.

In some embodiments, 3-D printing a glove, or a component thereof, can comprise 3-D printing the glove or component in an intermediate green state, shaping and/or assembling the glove or component in the green state, and curing the green state in its final shape. In some embodiments, 3-D printing a glove, or component thereof, can comprise 3-D printing the glove or component thereof in an intermediate green state, expanding and/or assembling the intermediate green state, and curing the green state in its final shape. In some embodiments, 3-D printing a glove, or component thereof, can comprise 3-D printing the glove or component in an intermediate green state, expanding and/or assembling the intermediate green state, shaping the article or component in the green state, and curing the green state in its final shape.

In some embodiments, 3-D printing a glove, or component thereof, can comprise 3-D printing multiple components in an intermediate green state, shaping and/or assembling the components in the green state, and curing the green state in its final shape. In some embodiments, 3-D printing a glove, or component thereof, can comprise 3-D printing multiple components in an intermediate green state, expanding and/or assembling the components in the green state, and curing the green state in its final shape.

Techniques for producing an intermediate green state object from resins by additive manufacturing are known. Suitable techniques include bottom-up and top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the additive manufacturing step can be carried out by one of the family of methods sometimes referred to as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, *Science* 347, 1349-1352 (2015); and in R. Janusziewcz et al., Layerless fabrication with continuous liquid interface production, *Proc. Natl. Acad. Sci. USA* 113, 11703-11708 (Oct. 18, 2016). Other examples of methods and apparatus for carrying out particular embodiments of CLIP include, but are not limited to: Batchelder et al., US Patent Application Pub. No. US 2017/0129169 (May 11, 2017); Sun and Lichkus, US Patent Application Pub. No. US 2016/0288376 (Oct. 6, 2016); Willis et al., US Patent Application Pub. No. US 2015/0360419 (Dec. 17, 2015); Lin et al., US Patent Application Pub. No. US 2015/0331402 (Nov. 19, 2015); D. Castanon, US Patent Application Pub. No. US 2017/0129167 (May 11, 2017). B. Feller, US Pat App. Pub. No. US 2018/0243976 (published Aug. 30, 2018); M. Panzer and J. Tumbleston, US Pat App Pub. No. US 2018/0126630 (published May 10, 2018); K. Willis and B. Adzima, US Pat App Pub. No. US 2018/0290374 (Oct. 11, 2018) L. Robeson et al., PCT Patent Pub. No. WO 2015/164234 (see also U.S. Pat. Nos. 10,259,171 and 10,434,706); and C. Mirkin et al., PCT Patent Pub. No. WO 2017/210298 (see also US Pat. App. US 2019/0160733). The disclosures of these patents and applications are incorporated by reference herein in their entirety.

While stereolithography techniques such as CLIP can be preferred, it will be appreciated that other additive manufacturing techniques, such as jet printing (see, e.g., U.S. Pat. No. 6,259,962 to Gothait and US Patent App. Ser. No. US 2020/0156308 to Ramos et al.), can also be used.

Figure 1B:
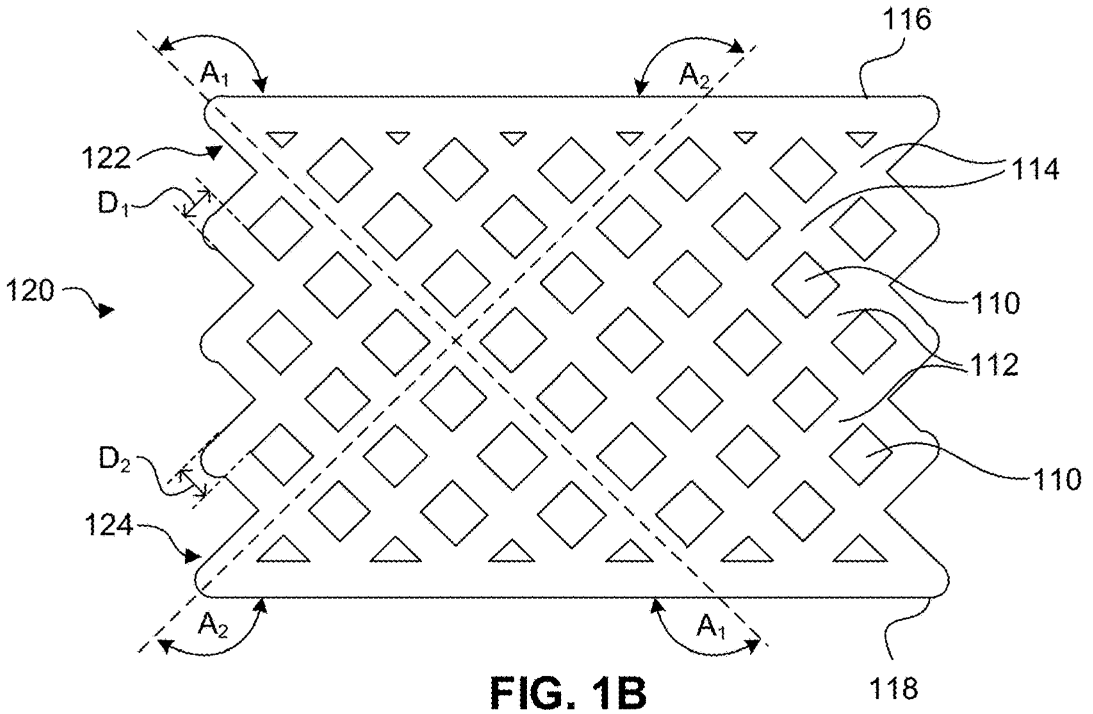
FIG. 1B shows a cross-sectional view of the glove of FIG. 1A, according to some embodiments.

In some embodiments, any component of a glove described herein (for example, the wrist portion 102, the central portion 104, the finger portions 106, etc.) can comprise a three-dimensional mesh comprising a plurality of interconnected unit cells. In some embodiments, multiple components of gloves described herein can comprise a three-dimensional mesh comprising a plurality of interconnected unit cells, with each unit cell comprising a plurality of unit cell struts defining a three-dimensional structure and a plurality of nodes at which one or more unit cell struts are connected. As a non-limiting example shown in FIG. 1A, one or more of the wrist portion 102, the central portion 104, or the finger portions 106 can comprise a three-dimensional mesh 108 comprising interconnected unit cells 110 (as shown in FIG. 1B). In some embodiments, the interconnected unit cells 110 can comprise struts 112 defining a three-dimensional structure and nodes 114 at which the struts 112 are connected (as shown in FIG. 1B).

As used herein, the term three-dimensional mesh refers to a three-dimensional structure comprising the unit cells 110 arranged in a web-like structure or a lattice structure. The web-like or lattice structure of a three-dimensional mesh can comprise interconnected structural members (for example, the struts 112 or ribbons) defining the unit cells 110. In embodiments comprising the struts 112, the struts 112, and thus the unit cells 110, can be connected at the nodes 114. For example, the struts 112 can be connected at the nodes 114 and define the unit cells 110 arranged in a lattice configuration. In some embodiments, the unit cells 110 can be arranged in a regular or repeating lattice configuration. In some embodiments, the three-dimensional mesh 108 can be an additively manufactured (3-D printed) structure. Exemplary lattice configurations can include, but are not limited to, basic cubic lattices, body-centered cubic lattices, face-centered cubic lattices, and modified lattices based on these lattice types. Exemplary lattice configurations can include, but are not limited to the lattice structures described in U.S. patent application Ser. Nos. 17/069,623 and 18/313,135, which are hereby incorporated by reference in their entireties.

The unit cells 110 can have various dimensions and geometries. Further, the unit cells 110 within a three-dimensional mesh can be the same or can differ. Thus, the three-dimensional mesh 108 can comprise unit cells 110 of different dimensions or geometries. The three-dimensional shape of a unit cell 110 can be defined by the struts 112 connected to one another at the nodes 114. In such embodiments, each of the unit cells 110 can have a base geometry (for example, three-dimensional shape, connection, and arrangement of the struts 112 defining the unit cells 110). The base geometry of the unit cells 110 can be, but is not limited to, a dodecahedron (e.g., rhombic), a tetrahedron, an icosahedron, a cube, a cuboid, a prism, or a parallelepiped. Each node 114 can connect two or more of the struts 112.

In some embodiments, the unit cells 110 can comprise a solid representation of a repeating implicit surface of a lattice structure. In such embodiments, the unit cells 110 can comprise a "base surface geometry" defined by the base three-dimensional shape of a body formed by one or more ribbons (walls) of material that define a solid representation of an implicit surface for a full unit cell 110. In some embodiments, the implicit surface can be a periodic implicit surface such that the base surface geometry of each unit cell 110 contacts the base surface geometry of at least some adjacent unit cells 110 to create a lattice. One example of a suitable periodic surface is a gyroid, but any type of suitable periodic surface can be used.

Herein, a solid representation of an implicit surface refers to a solid object following the shape of an implicit surface. Whereas an actual implicit surface has no thickness, a solid representation of an implicit surface has a thickness on one or both sides of the actual implicit surface in a three dimensional space. The thickness gives the solid representation volume, meaning the solid representation can be built as a physical object from physical material. The added thickness or thicknesses can be uniform, or at least approximately uniform notwithstanding fillets or local deformities, and thin in comparison to the overall size of the represented implicit surface. In some embodiments, the relative density of a unit cell of the solid representation can be from 5% to 30%, from 5% to 40%, from 10% to 25%, or from 15% to 20%. The term "relative density" as used herein refers to an amount of a unit cell occupied by solid material as a percentage of a total volume of the unit cell.

In some embodiments, the implicit surfaces can be created using a combination of random Fourier series functions, in which linear and/or nonlinear coefficients as well as linear and nonlinear variables inside sine and cosine terms over the x, y and z space are iterated to generate the functions. The resulting unit cells can have different planes of symmetry, such as, in various examples, zero planes of symmetry, one plane of symmetry, or more than one plane of symmetry. The function can be derived in a way that satisfies the periodicity of the unit cell. Criteria for the selection of an applicable implicit surface within the design space domain can include any one or any combination of number of terms in the equation, number of connected components, the edge boundary length, surface area, and volume fraction.

Additive manufacturing processes can create components that are a single piece. For example, an additive manufacturing process can create components that are continuous and do not comprise any seams or other types of material discontinuities. Thus, at least one of the parts or portions of gloves described herein (for example, the wrist portion 102, the central portion 104, the finger portions 106, etc.) can be a single piece.

In some embodiments, various parts of glove 100 can be customized to a wearer's liking. For example, the wearer can customize two or more of the wrist portion 102, the central portion 104, or the finger portions 106 to have shapes, sizes, colors, and performance characteristics that meet desired requirements of the wearer. For example, the wearer can choose to customize the portions of the glove 100 to be softer and more flexible for greater comfort. The wearer can also choose to customize the portions of the glove 100 to be stiffer for better performance when, for example, catching a ball, blocking a ball, etc. In some embodiments, each of the portions of the glove 100 can be formed of smaller parts that can each be customized according to the preferences of the wearer.

FIG. 1B shows a cross-sectional view across 1-1 of the glove 100 of FIG. 1A, according to some embodiments. In some embodiments, all or a portion of the structure of the glove 100 can comprise an outer skin 116, an inner skin 118, and a core 120 disposed between the outer skin 116 and the inner skin 118 and extending between the outer skin 116 and the inner skin 118. In some embodiments, the inner skin 118 can be omitted such that the structure of the glove 100 can comprise the outer skin 116 and the core 120. In some embodiments, the outer skin 116 can be omitted such that the structure of the glove 100 can comprise the inner skin 118 and the core 120. In some embodiments, both the outer skin 116 and the inner skin 118 can be omitted such that the structure of the glove 100 can comprise the core 120.

In some embodiments, the outer skin 116, the inner skin 118, and the core 120 can be additively manufactured. In some embodiments, the outer skin 116, the inner skin 118, and the core 120 can be integrally formed as a single part. In some embodiments, the outer skin 116, the inner skin 118, and the core 120 can be additively manufactured from a curable resin. In some embodiments, the outer skin 116, the inner skin 118, and the core 120 can be formed separately and then joined, for example, during a curing process.

In some embodiments, the struts 112 can comprise a first group 122 and a second group 124. In some embodiments, the first group 122 of the struts 112 can be oriented at a first angle $A_1$ relative to the outer skin 116 and the inner skin 118. In some embodiments, the second group 124 of the struts 112 can be oriented at a second angle $A_2$ relative to the outer skin 116 and the inner skin 118. In some embodiments, the first angle $A_1$ and the second angle $A_2$ can be approximately equal. In some embodiments, the first angle $A_1$ and the second angle $A_2$ can be different (for example, at least 5% different from each other). In some embodiments, the first group 122 of the struts 112 can be oriented perpendicular to the outer skin 116 and the inner skin 118, and the second group 124 of the struts 112 can be oriented parallel to the outer skin 116 and the inner skin 118. In some embodiments, the first group 122 of the struts 112 can be oriented perpendicular to the outer skin 116 and the inner skin 118, and the second group 124 of the struts 112 can be oriented at an angle between 0 and 90 degrees relative to the outer skin 116 and the inner skin 118.

In some embodiments, the first group 122 of the struts 112 can comprise a first effective diameter $D_1$ and the second group 124 of the struts 112 can comprise a second effective diameter $D_2$. As used herein, the term "effective dimeter" is utilized to describe the diameter or size of a feature (for example, a strut), but this term should not be interpreted as requiring that the feature have a circular shape or cross-section. Instead, features can comprise non-circular shapes or cross-sections. For example, struts can have non-circular cross-sectional shapes, and in such embodiments the term "effective diameter" is intended to refer to the maximum cross-sectional dimension of the cross-sectional shape. For example, the "effective diameter" of a strut having a square cross-sectional shape would be the diagonal dimension across the square. As another example, the "effective diameter" of a strut having an oval cross-sectional shape would be the length of the oval-shape's major axis. For a feature having an effective diameter that varies along the length of the feature (for example, an hourglass shape), the effective diameter is the smallest effective diameter. The cross-sectional shape of a strut is the shape of the strut in a cross-section perpendicular to the length of the strut between two nodes.

Figure 5A:
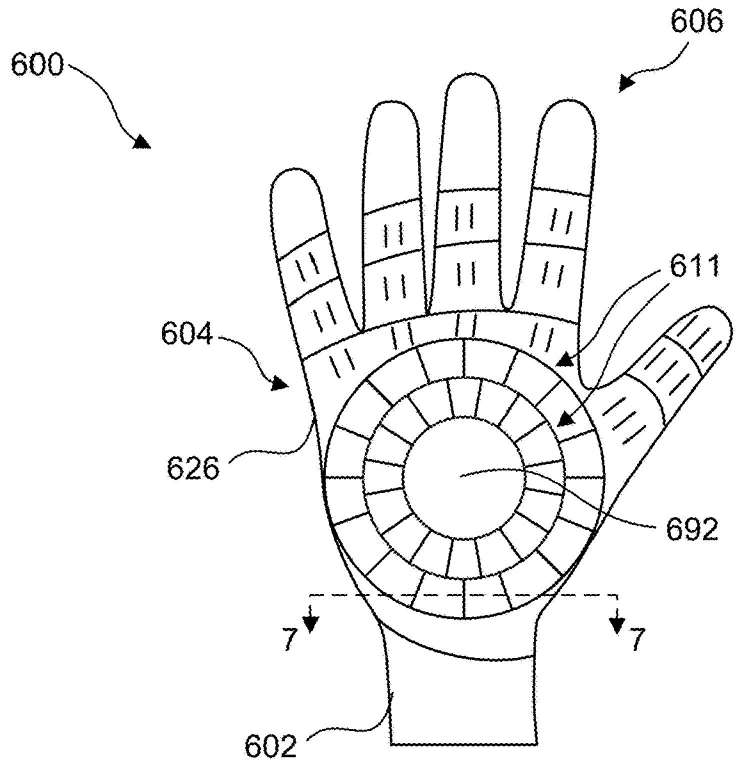
FIG. 5A shows a glove, according to some embodiments.

In some embodiments, the first effective diameter $D_1$ and the second effective diameter $D_2$ can be approximately equal. In some embodiments, the first effective diameter $D_1$ and the second effective diameter $D_2$ can be different (for example, at least 5% different from each other). In some embodiments, the outer skin 116 and the inner skin 118 can move relative to each other in response to a force, and the relative movement can be facilitated based on the values of first effective diameter $D_1$ and the second effective diameter $D_2$. Such embodiments are described with reference to FIGS. 5A-5B.

Figure 1C:
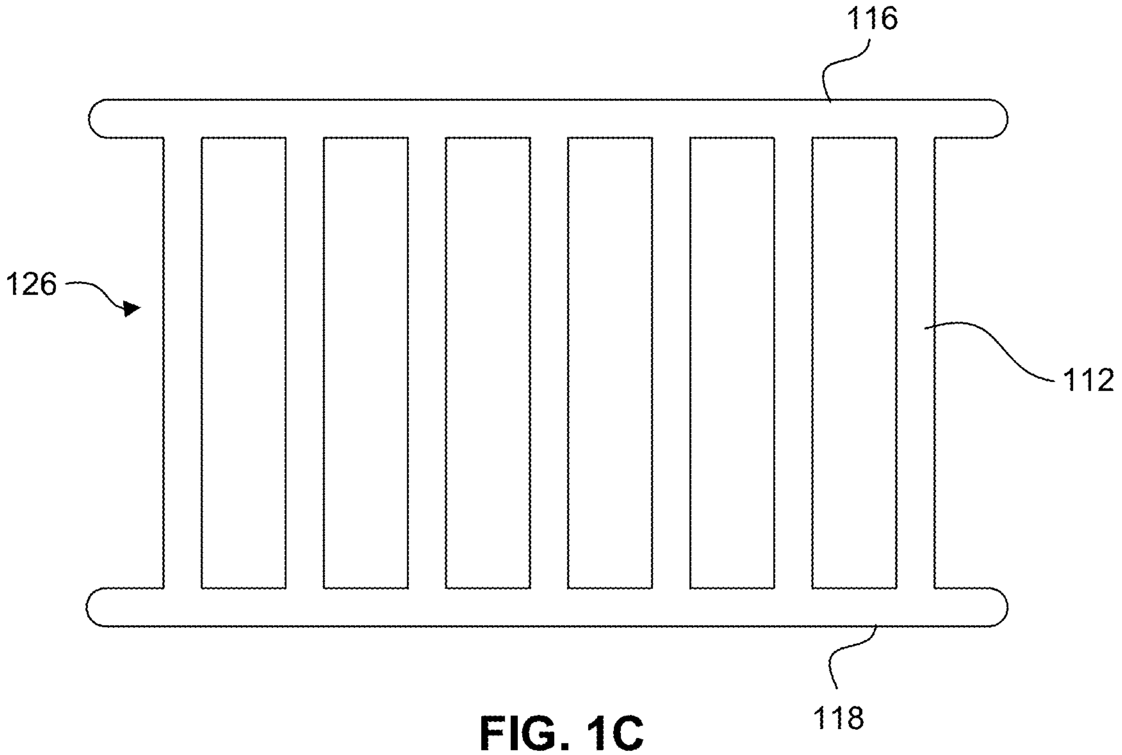
FIG. 1C shows a cross-sectional view of the glove of FIG. 1A, according to some embodiments.

FIG. 1C shows a cross-sectional view across 1-1 of the glove 100 of FIG. 1A, according to some embodiments. In some embodiments, all or a portion of the structure of the glove 100 can comprise the outer skin 116, the inner skin 118, and a core 126 disposed between the outer skin 116 and the inner skin 118 and extending between the outer skin 116 and the inner skin 118. In some embodiments, the inner skin 118 can be omitted such that the structure of the glove 100 can comprise the outer skin 116 and the core 126. In some embodiments, the outer skin 116 can be omitted such that the structure of the glove 100 can comprise the inner skin 118 and the core 126.

The core 126 can comprise struts 112 oriented perpendicular to the outer skin 116, the inner skin 118, or both. In some embodiments, the struts 112 of core 126 can be oriented at an angle between 0 and 90 degrees relative to the outer skin 116 and the inner skin 118. Thus, in such embodiments, the core 126 may not comprise unit cells. Struts 112 of the core 126 can comprise opposing ends directly coupled to outer skin 116 and inner skin 118, respectively.

In some embodiments, the outer skin 116, inner skin 118, or both can be devoid of unit cells 110. In some embodiments, the outer skin 116, inner skin 118, or both can comprise a plurality of continuous beams 103 (shown in FIG. 1A) extending adjacent to each other and defining at least part of the glove 100. For example, the plurality of continuous beams 103 can define at least part of the wrist portion 102, the central portion 104, the finger portions 106, or a combination thereof. Adjacent continuous beams 103 can be separated by spaces 105 along at least a portion of the wrist portion 102, the central portion 104, the finger portions 106, or a combination thereof. Continuous beams 103 of the outer skin 116 and/or inner skin 118 may not define a portion of a repeating unit cell (for example, a unit cell 110 as described herein). In embodiments comprising struts 112, struts 112 can extend from a continuous beam 103 of outer skin 116 to a continuous beam 103 of inner skin 118. Alternatively, in some embodiments, all or a portion of outer skin 116, inner skin 118, or both can comprise a continuous, non-porous skin.

In embodiments comprising continuous beams 103, a surface contour of all or a portion of glove 100 (for example, a surface contour of wrist portion 102, central portion 104, finger portions 106, or a combination thereof) can be defined the continuous beams 103. In such embodiments, grooves or recesses between continuous beams 103 do not define the shape of the surface contour. Rather, the surface contour is characterized by the overall outmost shape of wrist portion 102, central portion 104, and/or finger portions 106 defined by inner skin 118, outer skin 116, or both. The surface contour defined by the inner skin 118 is the surface contour facing a wearer's hand during use. The surface contour defined by the outer skin 118 is the surface contour facing away from a wearer's hand during use.

In some embodiments, continuous beams 103 can extend continuously at the surface contour, with the plurality of continuous beams 103 extending continuously along wrist portion 102, central portion 104, and/or finger portions 106. In some embodiments, one or more continuous beams 103 can extend continuously along a distance of at least 5 centimeters. In some embodiments, one or more of the continuous beams 103 can extend continuously along a distance of at least 10 centimeters. In some embodiments, one or more of the continuous beams 103 can extend continuously along a distance of at least 15 centimeters. In some embodiments, one or more of the continuous beams 103 can extend continuously in a straight line. In some embodiments, one or more of the continuous beams 103 can extend continuously in a curved line.

In some embodiments, adjacent continuous beams of the plurality of continuous beams 103 can extend substantially parallel to each other at the surface contour. As used herein, "substantially parallel" means that two or more of the continuous beams 103 either: (i) extend along straight or curved lines that are exactly a parallel to each other for a specified length, or (ii) extend along straight or curved lines that extend +/−10 degrees relative to parallel of each other for a specified length. In some embodiments, the specified length can be at least can be at least 5 mm, at least 10 mm, or at least 15 mm.

In embodiments comprising the plurality of continuous beams 103 that extend substantially parallel to each other at the surface contour, the plurality of continuous beams 103 can define a lenticular structure at the surface contour.

Adjacent continuous beams 103 extending at the surface contour can be spaced apart from each other by the space 105, as illustrated in for example FIG. 1A. In some embodiments, the space 105 can comprise a spacing distance 109 between adjacent continuous beams 103 that can range from greater than or equal to 0.1 mm to less than or equal to 10 mm.

In some embodiments, the spacing distance 109 between two adjacent continuous beams 103 can be constant along a specified length, for example at least 5 mm, at least 10 mm, or at least 15 mm. In such embodiments, the two adjacent continuous beams 103 can extend along straight or curved lines that are exactly a parallel to each other for the specified length.

In some embodiments, the spacing distance 109 between two adjacent continuous beams 103 can vary along the inner skin 118 or outer skin 116. In such embodiments, the two adjacent continuous beams 103 can extend along straight or curved lines that are not exactly parallel to each other for a specified length. In some embodiments, inner skin 118 or outer skin 116 can comprise one or more zones 107 where the spacing distance 109 between two or more adjacent continuous beams 103 is zero. In such embodiments, the two or more adjacent continuous beams 103 can merge together at the surface contour. In some embodiments, the two or more adjacent continuous beams 103 can be spaced apart as the continuous beams 103 approach the zone 107, merge in the zone 107, and then diverge in a spaced apart relationship after the zone 107. In some embodiments, the zone 107 can comprise three or more, four or more, or five or more adjacent beams 103 that merge together.

In some instances, embodiments of the present application can comprise a glove with finger portions that have different bending characteristics. For example, a user may want to allow flexion of the fingers toward a palm portion of the glove and limit extension of the fingers away from the palm portion of the glove. Such embodiments can support the fingers of the user, for example, when blocking or catching a ball.

Figure 2A:
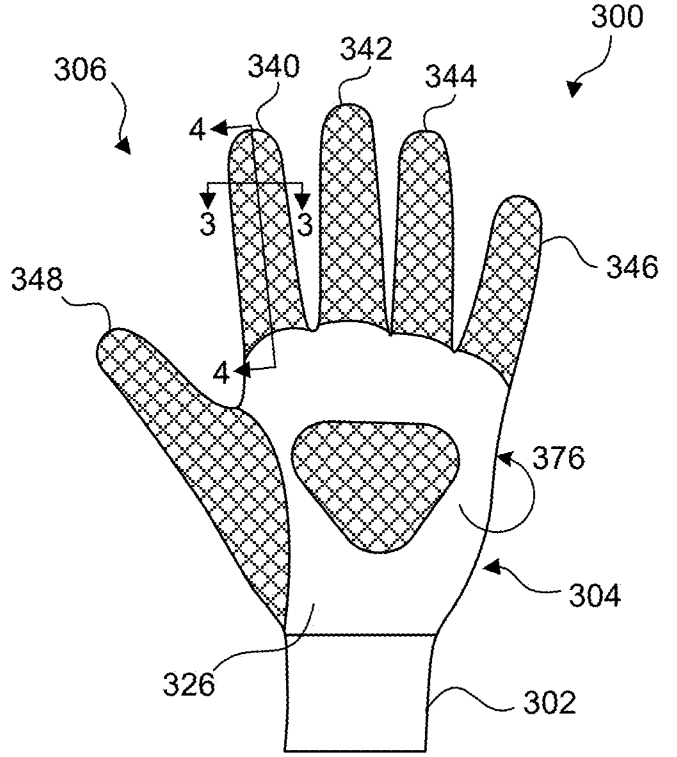
FIG. 2A shows a glove, according to some embodiments.

FIG. 2A shows a glove 300, according to some embodiments. In some embodiments, the glove 300 can be similar to the glove 100 aside from the differences noted herein. In some embodiments, the glove 300 can comprise a wrist portion 302, a central portion 304, and finger portions 306. In some embodiments, the central portion 304 can comprise a palm portion 326 located opposite a back portion 376. In some embodiments, the finger portions 306 can comprise a finger 340, a finger 342, a finger 344, a finger 346, and a thumb 348. In some embodiments, the finger 340, the finger 342, the finger 344, the finger 346, and the thumb 348 can comprise similar bending properties. In some embodiments, at least one of the finger 340, the finger 342, the finger 344, the finger 346, and the thumb 348 can comprise bending properties that are different than the bending properties of the remainder of the finger 340, the finger 342, the finger 344, the finger 346, and the thumb 348. In some embodiments, each of the finger 340, the finger 342, the finger 344, the finger 346, and the thumb 348 can comprise different bending properties. The bending properties of the finger 340, the finger 342, the finger 344, the finger 346, and the thumb 348 are described with reference to FIG. 2B.

Figure 2B:
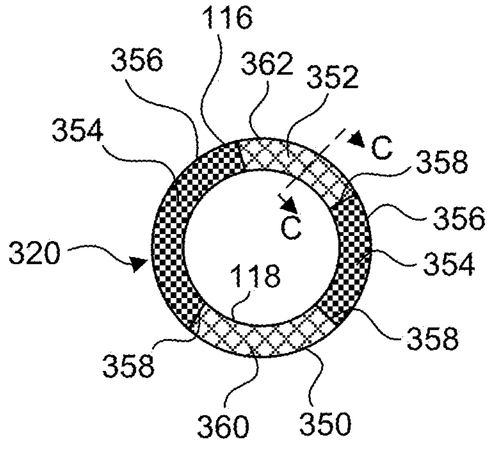
FIG. 2B shows a cross-sectional view of a finger portion of the glove of FIG. 2A, according to some embodiments.

FIG. 2B shows a cross-sectional view across 3-3 of the finger 340 of the glove 300 of FIG. 2A, according to some embodiments. In some embodiments, the finger 340 can comprise a structure similar to that previously described with respect to FIG. 1B. For example, the finger 340 can comprise the outer skin 116 and the inner skin 118. In some embodiments, the finger 340 can also comprise a core 320. In some embodiments, core 320 can comprise unit cells 110. In some embodiments, the core 320 can comprise a structure configured to impart the desired bending characteristics to the finger 340. In some embodiments, the core 320 can comprise a first core section 350 that extends from the palm portion 326. In some embodiments, the core 320 can comprise a second core section 352 that extends from the back portion 376. In some embodiments, the core 320 can comprise a third core section 356 that is disposed between the first core section 350 and the second core section 352. In some embodiments, the third core section 356 can meet the first core section 350 and the second core section 352 at a transition section 358. In some embodiments, the third core section 356 can be omitted, allowing the first core section 350 and the second core section 352 to meet at the transition section 358.

In some embodiments, the first core section 350 can comprise a three-dimensional mesh 360 defined by unit cells 110. In some embodiments, the second core section 352 can comprise a three-dimensional mesh 362 defined by unit cells 110. In some embodiments, the second core section 352 can comprise a three-dimensional mesh 362 defined by unit cells 110 and the first core section 350 can be devoid of unit cells 110. For example, the first core section 350 can comprise core 126 with struts 112 having ends directly coupled to the inner skin 116 and the outer skin 118.

In some embodiments, the first core section 350 can comprise a first three-dimensional mesh 360 defined by a first group of unit cells 110. In some embodiments, the second core section 352 can comprise a second three-dimensional mesh 362 defined by a second group of unit cells 110.

In some embodiments, the second three-dimensional mesh 362 can be denser than the first three-dimensional mesh 360. The difference in densities between the second three-dimensional mesh 362 and the first three-dimensional mesh 360 can facilitate different bending characteristics for the finger 340 in the flexion direction (toward the palm portion 326) and the extension direction (away from the palm portion 326 and toward the back portion). For example, in some embodiments, a bending stiffness of the finger 340 in the extension direction can be greater than a bending stiffness of the finger 340 in the flexion direction. The difference in stiffness can limit movement of the finger 340 in the extension direction to support the finger 340 when impacted, for example, by an object such as a ball. Such support can help the user catch or block the ball instead of dropping the ball or allowing the ball to pass.

In some embodiments, the increased density of the second three-dimensional mesh 362 can be a result of (i) the struts 112 of unit cells 110 in the second three-dimensional mesh 362 having a larger average effective diameter than the struts 112 of the unit cells 110 in the first three-dimensional mesh 360, (ii) a larger number of unit cells 110 per unit volume in the second three-dimensional mesh 362, or both (i) and (ii).

In some embodiments, the first three-dimensional mesh 360 can be denser than the second three-dimensional mesh 362 such that the bending stiffness of the finger 340 in the flexion direction can be greater than the bending stiffness of the finger 340 in the extension direction. The difference in stiffness can limit movement of the finger 340 in the flexion direction to, for example, maintain the finger 340 in a position that supports catching a ball.

In some embodiments, a decreased density of the second three-dimensional mesh 362 can be a result of (i) the struts 112 of unit cells 110 in the second three-dimensional mesh 362 having a smaller average effective diameter than the struts 112 of the unit cells 110 in the first three-dimensional mesh 360, (ii) a smaller number of unit cells 110 per unit volume in the second three-dimensional mesh 362, or both (i) and (ii).

In some embodiments, the first three-dimensional mesh 360 can be less dense than the second three-dimensional mesh 362 such that the bending stiffness of the finger 340 in the extension direction can be greater than the bending stiffness of the finger 340 in the flexion direction. The difference in stiffness can limit movement of the finger 340 in the extension direction to, limit hyperextension of the finger 340 (for example, to limit instances in which a ball moves the finger 340 in the hyperextension direction).

In some embodiments, the third core section 356 can comprise a third three-dimensional mesh 354 defined by a third group of unit cells 110. In some embodiments, the third three-dimensional mesh 354 can comprise a density that is different from both the first three-dimensional mesh 360 and the second three-dimensional mesh 362.

In some embodiments, the first core section 350, the second core section 352, and the third core section 356 can be integrally formed as a single part. In some embodiments, the first core section 350, the second core section 352, and the third core section 356 can be formed during an additive manufacturing process to form a single, integral part.

Though the finger 340 was described above as comprising the various structures to facilitate desired bending characteristics, any of the finger 342, finger 344, the finger 346, or the thumb 348 can comprise the structures described above to facilitate desired bending characteristics.

Figure 2C:
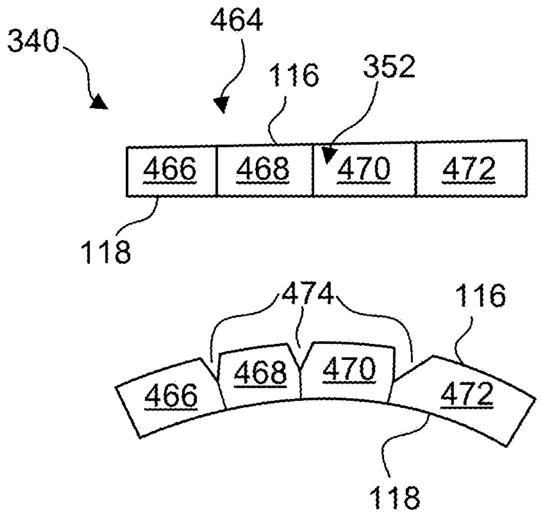
FIG. 2C shows a cross-sectional view of the finger portion of FIG. 2B, according to some embodiments.

In some embodiments, additional structures or configurations can be implemented to facilitate providing certain bending characteristics to one or more fingers of a glove. For example, FIG. 2C shows a cross-sectional view of the finger 340 across 4-4. In some embodiments, the finger 340 can comprise segments 464 that can move relative to each other during bending of the finger 340 in the flexion direction and the extension direction. In some embodiments, the segments 464 can comprise a first segment 466, a second segment 468, a third segment 470, and a fourth segment 472. In some embodiments, more or fewer of the segments 464 can be implemented. In some embodiments, the segments 464 can comprise the outer skin 116, the inner skin 118, and a core section 352. In some embodiments, the outer skin 116 can define grooves 474 that separate the segments 464. In some embodiments, the outer skin 116 can extend partially toward the inner skin 118 to define grooves 474 that separate the finger 340 into the segments 464.

In some embodiments, during flexion of the finger 340 toward the palm portion 326, the segments 464 can move away from each other and at least partially separate to expand the grooves 474 between the segments 464. In some embodiments, during extension of the finger 340 away from the palm portion 326, the segments 464 can contact each other to close the grooves 474 and define a fully extended position of the finger 340. Contact between the segments 464 in the fully extended position of the finger 340 can limit extension of the finger 340 beyond the fully extended position, thereby supporting the finger 340 when contacted, for example, by a ball.

Figure 3A:
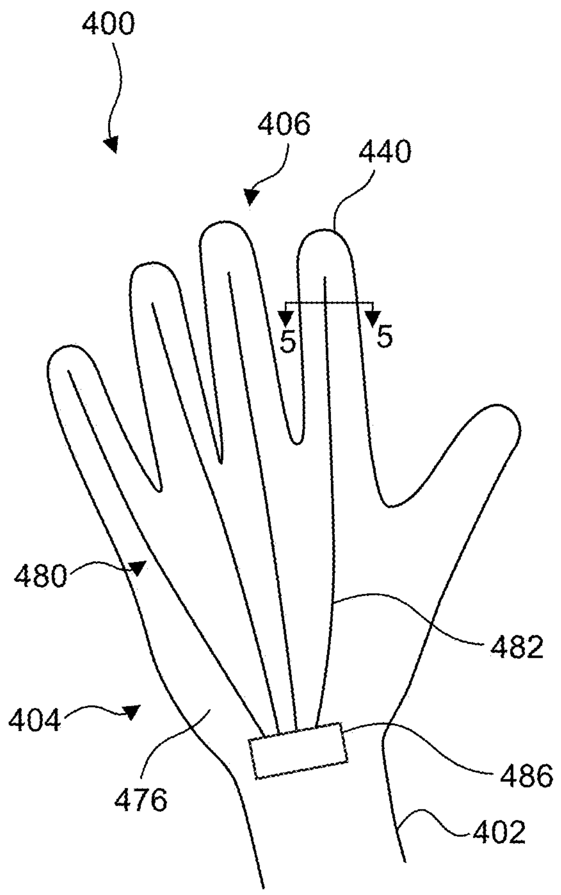
FIG. 3A shows a glove, according to some embodiments.

FIG. 3A shows a glove 400, according to some embodiments. In some embodiments, the glove 400 can comprise the structure of any of the previous gloves aside from the differences described herein. For example, the glove 400 can comprise finger portions 406, a central portion 404, and a wrist portion 402. In some embodiments, the central portion 404 can comprise a back portion 476. The glove 400 can comprise rods 480 that are disposed on or in the back portion 476 and extend along a length of the finger portions 406. For example, the rods 480 can comprise a first rod 482 extending along a length of a finger 440. In some embodiments, the rods 480 can extend from a base 486. In some embodiments, the base 486 can be coupled to the back portion 476 or the wrist portion 402. In some embodiments, the base can be 468 embedded with the core 120, 126 of the wrist portion 402.

In some embodiments, the rods 480 can be configured to limit extension of the finger portions 406 away from the palm portion of glove 400 in similar manner as described above for glove 300. In some embodiments, the rods 480 can comprise a material that is stiffer than the material that comprises the finger portions 406, the central portion 404, and/or the wrist portion 402, such that a force required to extend the finger portions 406 beyond the fully extended position can be greater than a force required to extend the finger portions 406 from a flexed position to the fully extended position. In some embodiments, the rods 480 can comprise a plastic material, a metal material, a fiber composite material, or a combination thereof.

Figure 3B:
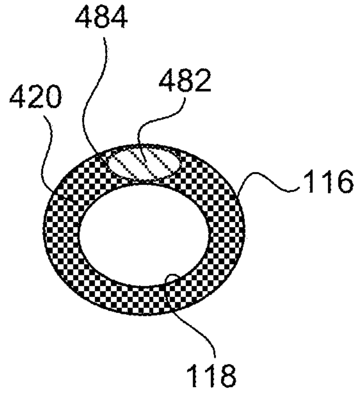
FIG. 3B shows a cross-sectional view of a finger portion of the glove of FIG. 3A, according to some embodiments.

FIG. 3B shows a cross-sectional view across 5-5 of the finger 440 of the glove 400 of FIG. 3A, according to some embodiments. In some embodiments, finger 440 can comprise the outer skin 116, the inner skin 118, and a core 420. In some embodiments, the core 420 can be similar to the core 120 or core 126 of the glove 100 of FIG. 1. In some embodiments, the core 420 can be similar to the core 320 of the glove 300 of FIGS. 2A-2B. Regardless of the structure of the core 420, the core 420 can define a channel 484 that extends through the core 420 and along a length of the finger 440. In some embodiments, the channel 484 can extend between the base 486 and a fingertip of the finger 440. In some embodiments, the channel 484 can extend between the base 486 and a location between the base 486 and the fingertip of the finger 440. In some embodiments, the channel 484 can be located in a back portion of the finger 440 (for example, the portion of the finger 440 extending from the back portion 476). In some embodiments, the channel 484 can be located in a side portion of the finger 440. In some embodiments, the finger 440 can comprise more than one of the channel 484, which can be located in various areas around the finger 340.

In some embodiments, the first rod 482 can be disposed in the channel 484 such that the first rod 482 is located within the core 420 and between the outer skin 116 and the inner skin 118. In some embodiments, the first rod 482 can comprise a circular cross-sectional shape. In some embodiments the first rod 482 can comprise other cross-sectional shapes such as square, rectangular, oval, or any other type of cross-sectional shape that can provide the desired bending properties. In some embodiments, the first rod 482 can comprise a continuous outer surface. In some embodiments, the first rod 482 can comprise a discontinuous outer surface such that the first rod 482 can comprise segments similar to the embodiment of FIG. 3C. In some embodiments, the first rod 482 can be disposed in the channel 484 such that the first rod 482 is free to move within the channel 484. In some embodiments, the first rod 482 can be coupled to the glove 400 at the channel 484. For example, the first rod 482 and the channel 484 can comprise connectors (for example, the connectors described with reference to FIG. 18) that can engage with each other to couple the first rod 482 to the channel 484.

In some embodiments, the first rod 482 can comprise the same material as the finger 440. In such embodiments, the first rod 482 can be manufactured to be denser than the finger 440. More specifically, the finger 440 can be manufactured using an additive manufacturing process to generate a lattice structure comprising the outer skin 116, the inner skin 118, and/or the core 420. The first rod 482 can be manufactured using the same additive manufacturing process used to generate the lattice structure, however the first rod 482 can be manufactured as a solid material (for example, a solid piece of material that does not comprise any holes or voids that are present in a lattice structure). Thus, in the example embodiment described, the first rod 482 can be stiffer than the finger 440 (for example, based on the first rod 482 being denser than the finger 440) even though the first rod 482 and the finger 440 can be manufactured using the same materials. In such embodiments, the first rod 482 is integrally formed with the finger 440.

Figure 4A:
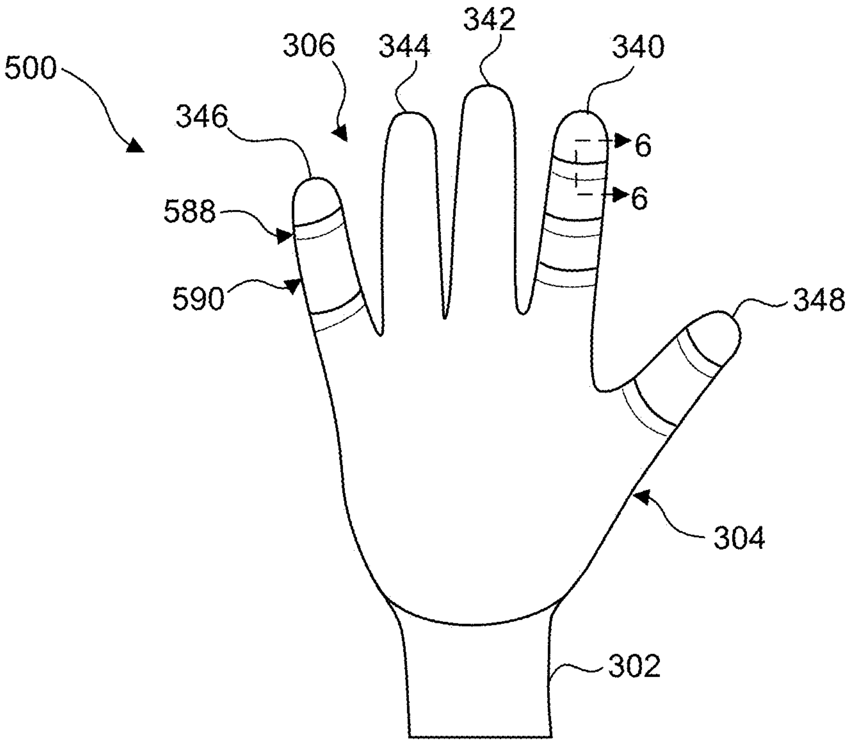
FIG. 4A shows a glove, according to some embodiments.

FIG. 4A shows a glove 500, according to some embodiments. In some embodiments, the glove 500 can comprise structures similar to those in any of the glove 100, the glove 300, or the glove 400, aside from the differences noted herein. For example, the glove 500 can comprise the wrist portion 302, the central portion 304, and finger portions 306, where each of the wrist portion 302, the central portion 304, and finger portions 306 can be additively manufactured. In some embodiments, the finger portions 306 can comprise joint portions 588. In some embodiments, one or more of the finger 340, the finger 342, the finger 344, the finger 346, and the thumb 348 can comprise the joint portions 588. In some embodiments, the finger portions 306 that comprise the joint portions 588 can comprise rod portions 590 located between the joint portions 588. In some embodiments, the joint portions 588 can facilitate bending of the finger portions 306 at the joint portions 588.

Figure 4B:
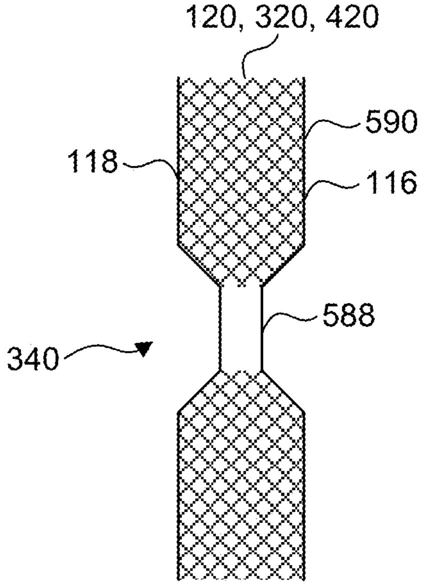
FIG. 4B shows a cross-sectional view of a portion of the glove of FIG. 4A, according to some embodiments.

FIG. 4B shows a cross-sectional view across 6-6 of the finger 340 of the glove 500 of FIG. 4A, according to some embodiments. In some embodiments, the rod portions 590 can comprise the outer skin 116, the inner skin 118, and a core (for example, the core 120, the core 320, or the core 420). In some embodiments, the joint portions 588 can comprise the outer skin 116 and the inner skin 118 and do not comprise a core (for example, the joint portions 588 do not comprise the core 120, the core 320, or the core 420). In such embodiments, because the joint portions 588 do not comprise a core, the rod portions 590 can be thicker than the joint portions 588. In embodiments where the joint portions comprise only the outer skin 116 and the inner skin 118, the outer skin 116 and the inner skin 118 can merge together at joint portions 588.

In some embodiments, the joint portions 588 can be configured to align with the joints of fingers of a user such that, when the user bends a finger, a corresponding portion of the finger portions 306 can bend at the joint portions 588. For example, when the user bends a finger that corresponds to the finger 340, the finger 340 can bend at the joint portions 588. In some embodiments, bending of the rod portions 590 can be limited during bending of the joint portions 588 (for example, the rod portions 590 can remain straight during bending of the joint portions 588). In some embodiments, the rod portions 590 can bend during bending of the joint portions 588.

In some instances, when an object, such as a ball, contacts a glove at a peripheral portion of the glove (for example, on an edge of a palm portion of the glove), the ball can deflect off of the glove and away from the hand of the user. Deflecting the object away from the hand of the user can cause the user to drop the ball when attempting to catch the ball, let the ball into a goal when trying to stop the ball from entering the goal, etc. Embodiments of the present application can comprise structures that redirect a force imparted to a glove by an object to support the user when attempting to perform an athletic activity.

FIG. 6 shows a glove 600, according to some embodiments. In some embodiments, the glove 600 comprise the structures of any of the previous gloves aside from the differences described herein. In some embodiments, the glove 600 can comprise a wrist portion 602, a central portion 604, and finger portions 606. In some embodiments, the wrist portion 602, the central portion 604, and the finger portions 606 can be additively manufactured. In some embodiments, the wrist portion 602, the central portion 604, and the finger portions 606 can be integrally formed as a single part. In some embodiments, the central portion 604 can comprise a palm portion 626 and a back portion. In some embodiments, the palm portion 626 can be configured to redirect a force F imparted to the palm portion 626 radially inward toward a center 692 of the palm portion 626. In some embodiments, the force F can be imparted perpendicular to a surface of the palm portion 626 (for example, perpendicularly into the page of FIG. 5A). In some embodiments, the force F can be imparted at a non-right angle relative to the surface of the palm portion 626 (for example, obliquely into the page of FIG. 5A).

In some embodiments, the palm portion 626 can comprise one or more concentric groups 611 of unit cells 610 that comprise unit cells 160 configured to deform radially inward toward the center 692 of the palm portion 626. In some embodiments, the one or more concentric groups 611 of unit cells 610 can fully surround the center 692. In some embodiments, the one or more concentric groups 611 of unit cells 610 can partially surround the center 692. Unit cells 610 can comprise groups of struts configured to deform in a radial direction 694 toward the center 692 of the palm portion 626 as described herein.

Figure 5B:
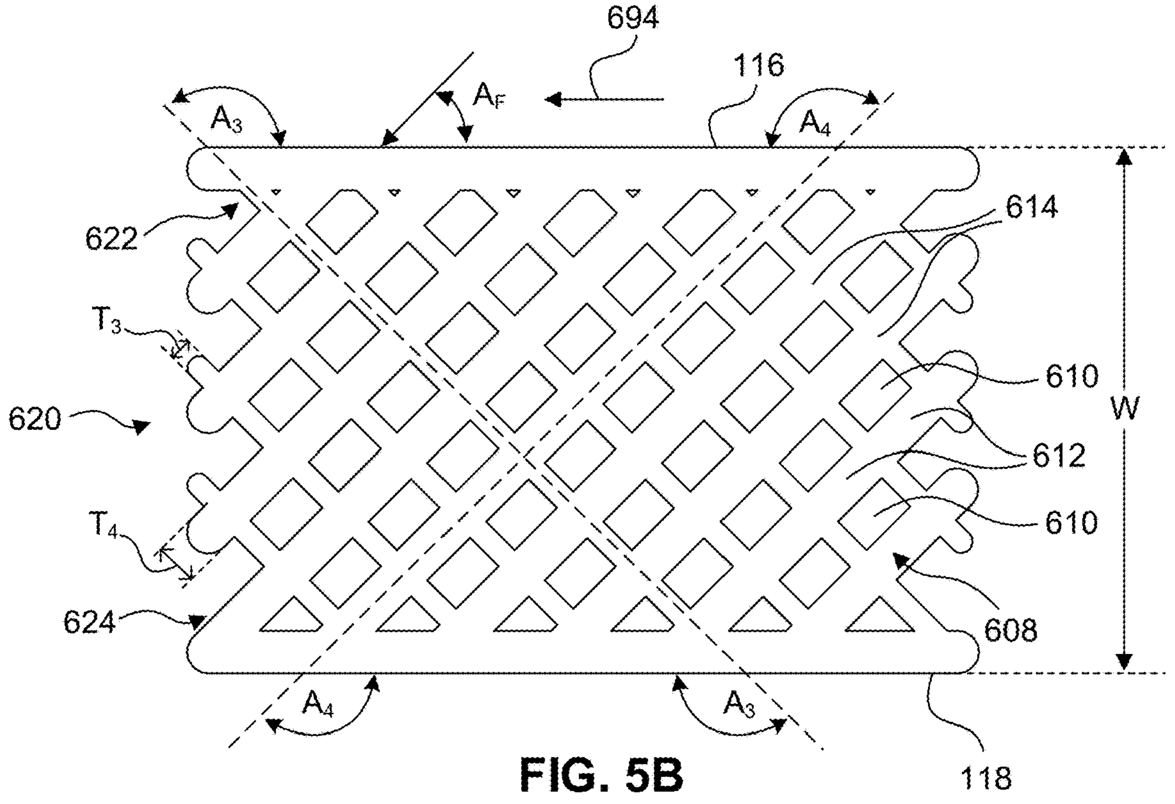
FIG. 5B shows a cross-sectional view of the glove of FIG. 5A, according to some embodiments.

FIG. 5B shows a cross-sectional view across 7-7 of the glove 600 of FIG. 6, according to some embodiments. In some embodiments, the structure of the glove 100 can comprise the outer skin 116, the inner skin 118, and a core 620 disposed between the outer skin 116 and the inner skin 118 and extending between the outer skin 116 and the inner skin 118. In some embodiments, the inner skin 118 can be omitted such that the structure of the glove 600 can comprise the outer skin 116 and the core 620. In some embodiments, the outer skin 116 can be omitted such that the structure of the glove 600 can comprise the inner skin 118 and the core 620. In some embodiments, both the outer skin 116 and the inner skin 118 can be omitted such that the structure of the glove 100 can comprise the core 620.

In some embodiments, the outer skin 116, the inner skin 118, and the core 620 can be additively manufactured. In some embodiments, the outer skin 116, the inner skin 118, and the core 620 can be integrally formed as a single part. In some embodiments, the outer skin 116, the inner skin 118, and the core 620 can be additively manufactured using, for example, a curable resin. In some embodiments, the outer skin 116, the inner skin 118, and the core 620 can be formed separately and then joined, for example, during a curing process.

In some embodiments, the core 620 can comprise a three-dimensional mesh 608 comprising interconnected unit cells 610. In some embodiments, the interconnected unit cells 610 can comprise struts 612 defining the three-dimensional mesh 608 and nodes 614 at which the struts 612 are connected. The unit cells 610, the struts 612, and the nodes 614 that comprise the three-dimensional mesh 608 can be similar to the unit cells 110, the struts 112, the nodes 114 that comprise the three-dimensional mesh 608 aside from the differences described herein.

In some embodiments, the struts 612 can comprise a first group 622 and a second group 624. In some embodiments, the first group 622 of the struts 612 can be oriented at a third angle $A_3$ relative to the outer skin 116 and the inner skin 118. In some embodiments, the second group 624 of the struts 612 can be oriented at a fourth angle $A_4$ relative to the outer skin 116 and the inner skin 118. In some embodiments the third angle $A_3$ and the fourth angle $A_4$ can be approximately equal. In some embodiments, the third angle $A_3$ and the fourth angle $A_4$ can be different (for example, at least 5% different from each other). In some embodiments, the first group 622 of the struts 612 can be oriented perpendicular to the outer skin 116 and the inner skin 118, and the second group 624 of the struts 612 can be oriented parallel to the outer skin 116 and the inner skin 118. In some embodiments, the first group 622 of the struts 612 can be oriented perpendicular to the outer skin 116 and the inner skin 118, and the second group 624 of the struts 612 can be oriented at an angle between 0 and 90 degrees relative to the outer skin 116 and the inner skin 118.

In some embodiments, the first group 622 of the struts 612 can comprise a third effective diameter $D_3$ and the second group 624 can comprise a fourth effective diameter $D_4$. In some embodiments, the fourth effective diameter $D_4$ can be greater than the third effective diameter $D_3$ (for example, at least 5% greater than the third effective diameter $D_3$). In some embodiments, the force F can be imparted to the outer skin 116 during an athletic competition. For example, a football can contact the glove 600 at the outer skin 116 when a goalkeeper attempts to prevent the football from entering a goal. In some embodiments, the force F can be imparted to the core 620 (for example, the force F can be transmitted to the core 620 via the outer skin 116) at an angle AF. In some embodiments, the angle AF can be between 0 and 180 degrees relative to the outer skin 116.

In some embodiments, the first group 622 of the struts 612 can comprise a first stiffness that corresponds to the third effective diameter $D_3$ and the second group 624 of the struts 612 can comprise a second stiffness that corresponds to the fourth effective diameter $D_4$. In some embodiments, the second stiffness can be greater than the first stiffness such that the second group 624 of the struts 612 is more resistant to deformation than the first group 622 of the struts 612. In some embodiments, when the force F is imparted to the core 620, the first group 622 of the struts 612 can deform more than the second group 624 of the struts 612 such that the core 620 deforms in a radial direction 694 toward the center 692 of the palm portion 626. In some embodiments, during deformation of the core 620 in the radial direction 694, the outer skin 116 can move relative to the inner skin 118 in the radial direction 694 toward the center 692 of the palm portion 626. In some embodiments, when the outer skin 116 moves relative to the inner skin 118, a width W of the core 620 can decrease relative to when the force F is not applied. In some embodiments, when the force F is removed from the core 620, the core 620 can return to the configuration the core 620 was in prior to when the force F was imparted to the core 620.

In some embodiments, the different stiffnesses for the first group 622 of the struts 612 and the second group 624 of the struts 612 can be additionally or alternatively provided by forming the first group 622 and the second group 624 with a different cross-sectional strut shape. For example, the first group 622 can comprise struts 612 having a circular cross-section and the second group 624 can comprise struts 612 having a rectangular cross-section.

In some instances, embodiments of the present application can comprise portions of a glove that extend and/or expand to limit movement of an object, such as a ball, that contacts the glove. For example, if a ball contacts a peripheral portion of a finger, the palm, etc., expansion or extension of the peripheral portion can limit or deflect travel of the ball.

Figure 6A:
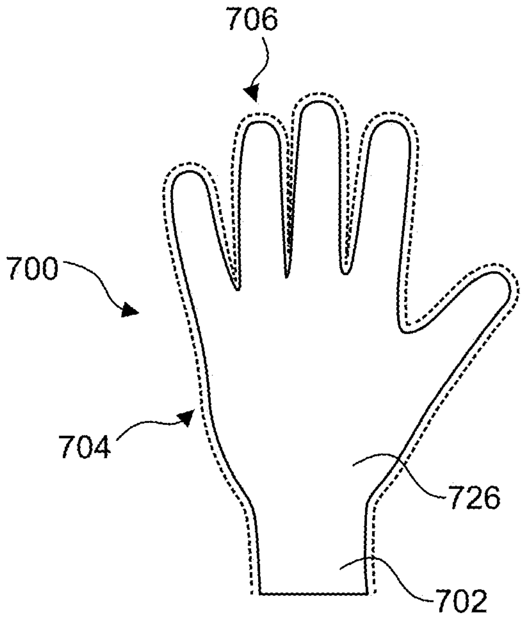
FIG. 6A shows a glove, according to some embodiments.

FIG. 6A shows a glove 700, according to some embodiments. In some embodiments, the glove 700 can be similar to any of the gloves previously disclosed, aside from the differences described herein. In some embodiments, the glove 700 can comprise a wrist portion 702, a central portion 704 that comprises a palm portion 726, and finger portions 706. In some embodiments, the glove 700 can comprise an additively manufactured outer skin, an additively manufactured inner skin, and an additively manufactured core that extends between the additively manufactured outer skin and the additively manufactured inner skin. Thus, the glove 700 can comprise a three-dimensional mesh comprising struts defining unit cells, where the struts are connected at nodes. In some embodiments, the three-dimensional mesh of the glove 700 can define unit cells that comprise auxetic physical properties. A three-dimensional mesh comprising auxetic physical properties can comprise a negative lattice Poisson's ratio. For example, a three-dimensional mesh comprising a negative lattice Poisson's ratio that is subjected to a force can expand in one or more directions perpendicular to the applied force. In some embodiments, the unit cells of the three-dimensional mesh of glove 700 can comprise a re-entrant shape (for example, a re-entrant square, a re-entrant hexagon, etc.) that can exhibit a negative lattice Poisson's ratio.

Figure 6B:
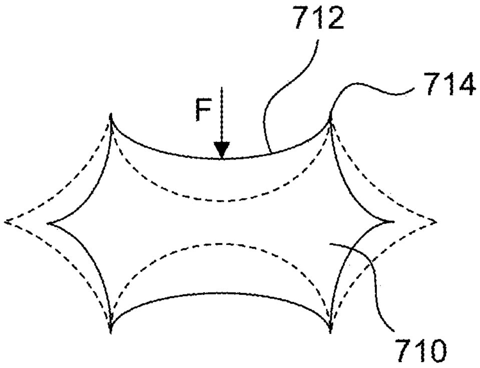
FIG. 6B shows a portion of the glove of FIG. 6A, according to some embodiments.
Figure 6C:
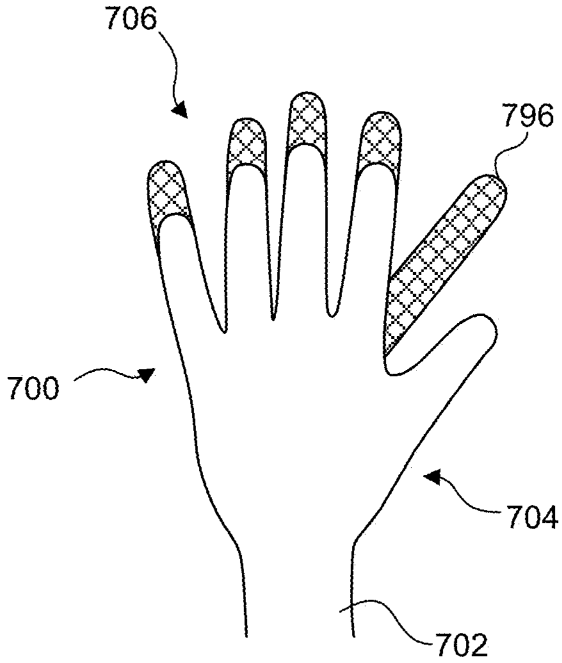
FIG. 6C shows a glove, according to some embodiments.

FIG. 6B shows a unit cell 710 of the glove 700 of FIG. 6A, according to some embodiments. In some embodiments, the unit cell 710 can comprise a re-entrant shape (for example, a shape whose sides are concave toward a center of the shape), such as a re-entrant hexagon. In some embodiments, the unit cell 710 can comprise struts 712 that meet at nodes 714. In some embodiments, a core of glove can comprise the unit cells 710. In some embodiments, the unit cell 710 can comprise an initial configuration (shown in solid lines). In some embodiments, the unit cell 710 can exhibit the initial configuration when not subjected to a force. In some embodiments, when the unit cell 710 is subjected to a force F, the unit cell 710 can move from the initial configuration to a deformed configuration (shown in dotted lines). In some embodiments, the unit cell 710 can compress in direction aligned with the force F, and the unit cell 710 can expand in a direction oblique to the force. In some embodiments, upon removal of the force F from the unit cell 710, the unit cell 710 can return to its initial configuration.

Returning to FIG. 6A, the glove 700 can comprise an initial configuration (shown in solid lines) that the glove 700 exhibits when the glove 700 is not subjected to the force F. When the force F is imparted to the glove 700 (for example, when a ball impacts the palm portion 726), the unit cells 710 that comprise the glove 700 can move to the deformed configuration as described with reference to FIG. 6B. In some embodiments, as the unit cells 710 move to the deformed configuration, the glove 700 can move from the initial configuration to the deformed configuration (shown in dotted lines). In some embodiments, a perimeter of the glove 700 can increase when the force F is imparted to the glove 700. In some embodiments, an area of the palm portion 726 of the glove 700, an area of one or more finger portions 706 of the glove 700, or both can increase when the force F is imparted to the glove 700. In some embodiments, a cross-sectional area of the palm portion 726 of the glove 700, an area of one or more finger portions 706 of the glove 700, or both can increase when the force F is imparted to the glove 700.

In some embodiments, a glove according to embodiments disclosed herein can comprise different groups of unit cells that can perform different functions. For example, a glove can comprise a first group of unit cells configured to deform radially inward, as described with reference to FIGS. 5A-5B, and a second group of unit cells configured to expand, as described with reference to FIGS. 6A-6B. In some embodiments, the first group of unit cells can be disposed in a first location on the glove (for example, a palm portion), and the second group of unit cells can be disposed in a second location on the glove (for example, the finger portions). In such embodiments, the advantages provided by each type of unit cell can aid the user in blocking and/or catching an object. For example, a force associated with the object striking the palm portion of the glove can be directed toward the center of the palm portion, thereby facilitating catching of the object. Furthermore, a force associated with the object striking the finger portions of the glove can cause the finger portions to extend and/or expand, thereby facilitating catching or blocking the object.

In some embodiments, the glove 700 can be configured to expand in a specific direction in response to the force F. In some embodiments, such as the embodiment shown in FIG. 6C, the finger portions 706 can increase in length in response to the force F imparted to the glove 700. For example, the finger portions 706 can comprise the unit cells 710 such that the unit cells 710 can extend in response to the force F.

In some embodiments, a projection 796 can articulate relative to the central portion 704 (more specifically, from the outer skin 116) in response to the force F. For example, the projection 796 can comprise a retracted position and an articulated position. When the force F is not imparted to the glove 700, the projection 796 can be in the retracted position (for example, the projection 796 can be in a first position relative to the central portion 704). When the force F is imparted to the glove 700, the projection 796 can be configured to move from the first position to a second position relative to the central portion 704. In some embodiments, when the projection 796 is in the first position, the projection 796 can extend a first distance from the central portion 704, and when the projection 796 is in the second position, the projection 796 can extend a second distance from the central portion 704, where the second distance is greater than the first distance. In some embodiments, when the projection 796 is in the first position, the projection 796 can be oriented at a first angle relative to the central portion 704, and the projection 796 can articulate relative to the central portion 704 to move from the first position to the second position. In some embodiments, when the projection 796 is in the second position, the projection 796 can be oriented at a second angle relative to the central portion 704, where the second angle is different from the first angle. In some embodiments, the projection 796 can comprise the unit cells 710 such that the unit cells 710 can extend in response to the force F to move the projection 796 from the first position to the second position.

In some embodiments, the projection 796 does not comprise auxetic unit cells 710 such that the projection 796 is not configured to articulate relative to the central portion 704 in response to the force. In such embodiments, the projection 796 can comprise unit cells 110.

In some instances, embodiments of the present application can comprise a glove that comprises features that can limit or reduce odors that can develop over time (for example, from perspiration trapped between the glove and hand of the user).

Figure 7:
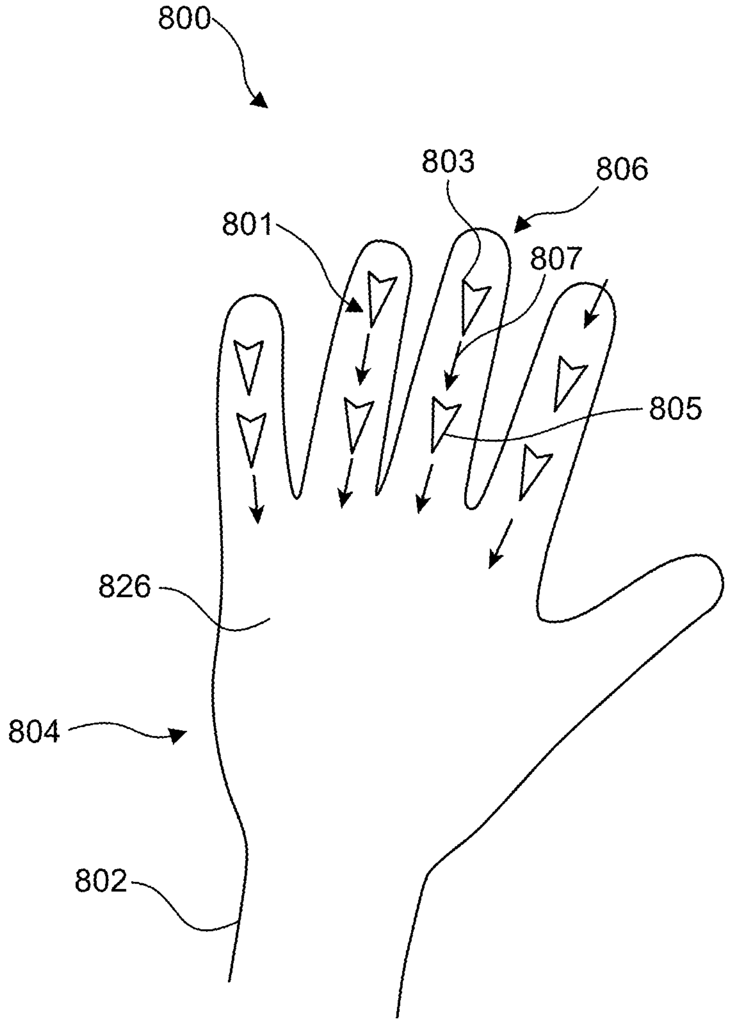
FIG. 7 shows a glove, according to some embodiments.

FIG. 7 shows a glove 800, according to some embodiments. In some embodiments, the glove 800 can be similar to any of the gloves previously described, aside from the differences disclosed herein. In some embodiments, the glove 800 can comprise an additively manufactured inner skin, an additively manufactured outer skin, and an additively manufactured core that extends between the additively manufactured outer skin and the additively manufactured inner skin. In some embodiments, the glove 800 can comprise a wrist portion 802, a central portion 804 that comprises a palm portion 826, and finger portions 806.

In some embodiments, at least one of the finger portions 806 or the palm portion 826 can define openings 801 that can allow air to enter and exit the glove 800. In some embodiments, the openings 801 can comprise an outer opening (for example, in the outer skin) and an inner opening (for example, in the inner skin). In some embodiments, the outer opening and the inner opening can be in fluid communication with each other to allow air to enter and exit the glove 800. For example, air can travel through the outer opening, through the core, and through the inner opening to reach the hand of the user. Air can also travel through the inner opening, through the core, and through the outer opening to reach the external environment.

In some embodiments, the openings 801 can comprise a first opening 803 and a second opening 805. In some embodiments, the first opening 803 and the second opening 805 can be configured to direct air through the glove 800. In some embodiments, the first opening 803 can comprise a first valve that can allow air to flow into the glove 800 and can limit air flowing out of the glove 800. In some embodiments, the second opening 805 can comprise a second valve that can allow air to flow out of the glove 800 and can limit air flowing into the glove 800. In some embodiments, the first valve and the second valve can be formed in the inner skin, the outer skin, the core, or a combination thereof. In some embodiments, air can flow into the glove 800 through the first opening 803 and flow out of the glove 800 through the second opening 805 (for example, in the direction of the arrow 807). Allowing air to flow through the glove 800 can limit the accumulation of moisture (for example, perspiration) between the hand of the user and the glove 800, thereby limiting odors associated with accumulated moisture. In some embodiments, one or more of the first opening 803 or the second opening 805 can comprise a one-way valve. In some embodiments, one or more of the first opening 803 or the second opening 805 can comprise a two-way valve that permits air flow into the glove 800 and air flow out of the glove 800.

In some embodiments, the openings 801 can be formed in the finger portions 806 of glove 800. In some embodiments, each of a plurality of the finger portions 806 can comprise a plurality of the openings 801. For example, in some embodiments, each of a plurality of the finger portions 806 can comprise a first opening 803 and a second opening 805.

As shown in FIG. 7, in some embodiments, the openings 801 can be located on the same side of the glove 800 as the palm portion 826. In some embodiments, the openings 801 can additionally or alternatively be located on an opposite side of the palm portion 826 (for example, a back portion similar to any of the back portions described herein). In some embodiments, the openings 801 can be formed in the palm portion 826, the back portion, or a combination thereof. In some embodiments, the openings 801 can be formed in the palm side of the finger portions 806, the back side of the finger portions 806, or a combination thereof. In some embodiments, the openings 801 can be formed in the finger portions 806 (for example, in the palm side of the finger portions 806, the back side of the finger portions 806, or a combination thereof), the palm portion 826, the back portion, or a combination thereof.

In some instances, embodiments of the present application can comprise a glove comprising structures (for example, one or more extensions) that can support catching or blocking an object such as a ball. For example, the structures can at least partially absorb energy from the object to aid in the ability to block or catch the object.

Figure 8:
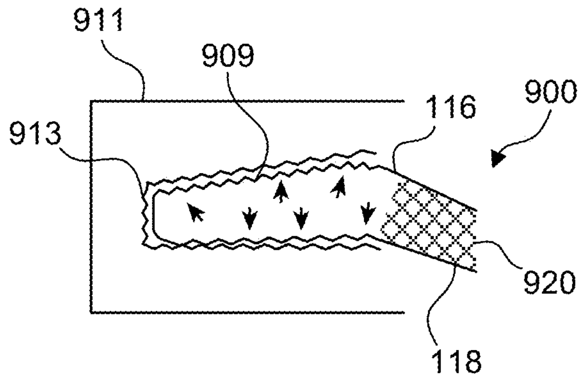
FIG. 8 shows a portion of a glove, according to some embodiments.

FIG. 8 shows a cross-sectional view of a portion of a glove 900, according to some embodiments. In some embodiments, the glove 900 can be similar to any of the gloves previously described, aside from the differences disclosed herein. In some embodiments, the glove 900 can comprise the outer skin 116, the inner skin 118, and a core 920 (for example, the core 920 can comprise a structure similar to any of the cores described herein). In some embodiments, the outer skin 116, the inner skin 118, and the core 920 can be additively manufactured as a single, integral part.

In some embodiments, the outer skin 116 can comprise a surface texture 909. In some embodiments, the surface texture 909 can comprise ridges that comprise peaks and valleys (for example, where the peaks extend away from the fingers of the user and the valley extend toward the fingers of the user). In some embodiments, the surface texture 909 can be added during the additive manufacturing process. In some embodiments, the surface texture 909 can be added during a molding process during or after the additive manufacturing process. For example, the glove 900, or a portion thereof, can be at least partially enclosed in a mold 911 while curing the glove 900. In some embodiments, the mold 911 can comprise an internal surface 913 that the outer skin 116 can contact as the glove 900 expands during the curing process. In some embodiments, as the glove 900 expands, the outer skin 116 can take the shape of the internal surface 913 of the mold 911, thereby generating the surface texture 909.

Figure 9:
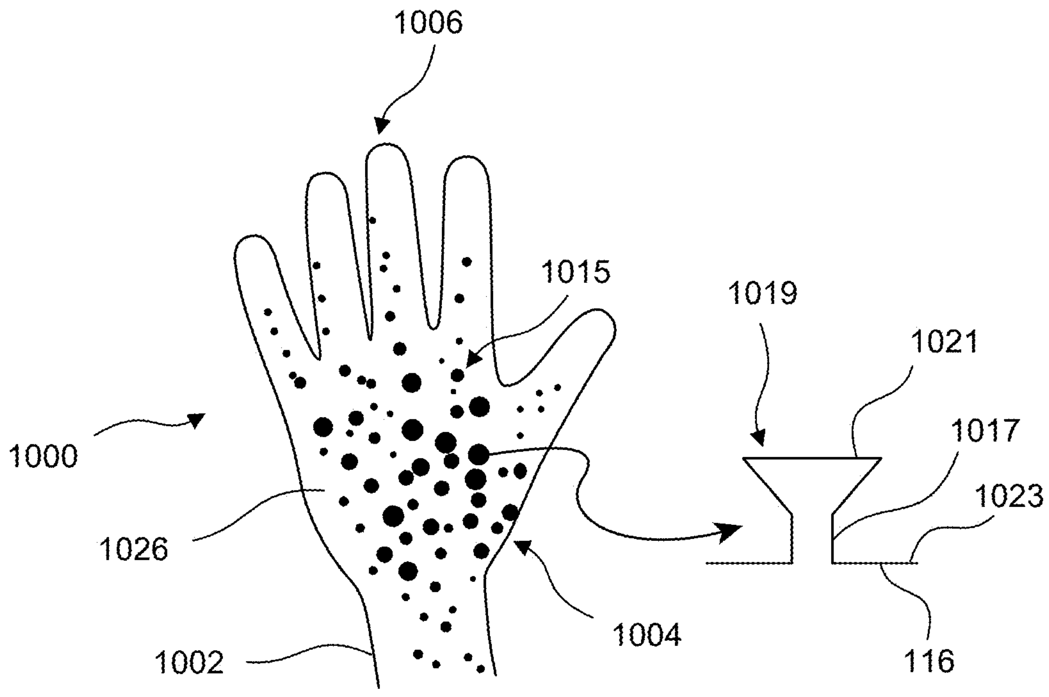
FIG. 9 shows a glove, according to some embodiments.

FIG. 9 shows a glove 1000, according to some embodiments. In some embodiments, the glove 1000 can be similar to any of the gloves previously described, aside from the differences disclosed herein. In some embodiments, the glove 1000 can comprise a wrist portion 1002, a central portion 1004 that comprises a palm portion 1026, and finger portions 1006. In some embodiments, the glove 1000 can comprise the outer skin 116, the inner skin 118, and a core (for example, the core can comprise a structure similar to any of the cores described herein). In some embodiments, the outer skin 116, the inner skin 118, and the core can be additively manufactured as a single, integral part.

In some embodiments, the outer skin 116 of one or more of the palm portion 1026 or the finger portions 1006 can comprise extensions 1015 that are integrally formed with the one or more of the palm portion 1026 or the finger portions 1006. In some embodiments, the extensions 1015 can comprise posts that extend away from one or more of the palm portion 1026 or the finger portions 1006. In some embodiments, an object, such as a ball, can contact the posts, and the posts can deform in response to the contact, thereby absorbing some energy from the ball to reduce the speed of the ball. Reducing the speed of the ball can increase the likelihood of the user catching or stopping the ball.

In some embodiments, the extensions 1015 can comprise suction cups that extend away from one or more of the palm portion 1026 (for example, an outer surface 1023 of the palm portion 1026) or the finger portions 1006. In such embodiments, the suction cups can comprise posts 1017 extending from the outer skin 116, and suction portions 1019 extending from the posts 1017. In some embodiments, the suction portions 1019 can comprise suction surfaces 1021 that are configured to engage an object, such as a ball, upon contact. For example, the suction surfaces 1021 can comprise a concave shape to promote securing the suction surfaces 1021 to the ball upon contact with the ball.

Figure 10:
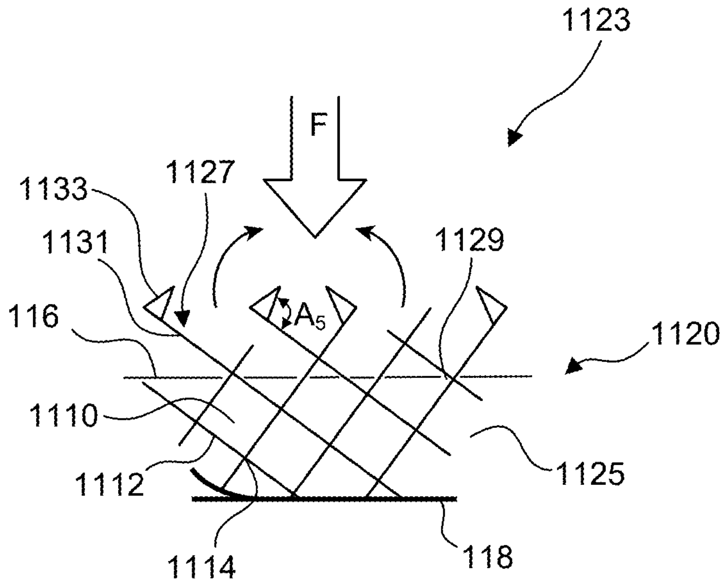
FIG. 10 shows a cross-sectional view of a portion of a glove, according to some embodiments.

In some embodiments, the structures that can support blocking or catching a ball can be part of a core of an additively manufactured glove. FIG. 10 shows a cross-sectional view of a portion 1123 of a glove (for example, any of the gloves previously described, aside from the differences noted herein), according to some embodiments. In some embodiments, the portion 1123 can comprise the outer skin 116, the inner skin 118, and a core 1120 disposed between the outer skin 116 and the inner skin 118 and extending between the outer skin 116 and the inner skin 118. In some embodiments, the outer skin 116, the inner skin 118 and the core 1120 can comprise a three-dimensional mesh 1125 comprising interconnected unit cells 1110. In some embodiments, the unit cells 1110 can comprise struts 1112 defining a three-dimensional structure and nodes 1114 at which the struts 1112 are connected.

In some embodiments, the core 1120 can comprise exposed struts 1127 that extend through the outer skin 116. In some embodiments, the exposed struts 1127 can extend from the struts 1112. In some embodiments, the outer skin 116 can define openings 1129 through which the exposed struts 1127 can extend. In some embodiments, each of the exposed struts 1127 can comprise a free end 1131 that is not connected to another strut at a node. In some embodiments, the free end 1131 can comprise a stem 1133 that extends from the free end 1131 at a non-zero angle $A_5$ relative to the exposed struts 1127. In some embodiments, the free end 1131 can extend radially inward toward a central portion of the glove. For example, the free end 1131 can extend radially inward toward a center of a palm of the glove (such as the center 692 of the glove 600).

In some embodiments, a force F imparted to the core 1120 (for example, a force of a ball contacting a glove) can cause the exposed struts 1127 to move toward a central portion of the glove. For example, a ball can contact the stem 1133 of the free end 1131, and the direction of the stem 1133 (for example, toward a central portion of the glove) can cause movement of the exposed struts 1127 in the direction of the stem 1133 (for example, toward the central portion of the glove).

In some embodiments, a portion of a glove as described herein (for example, all or a portion of the palm portion) does not comprise the outer skin 116, and the exposed struts 1127 can be located in the portion of the glove that does not comprise the outer skin 116. In some embodiments, a portion of a glove as described herein (for example, all or a portion of the palm portion) does not comprise the inner skin 118, and the exposed struts 1127 can be located in the portion of the glove that does not comprise the inner skin 118. In some embodiments, a portion of a glove as described herein (for example, all or a portion of the palm portion) does not comprise the outer skin 116 or the inner skin 118, and the exposed struts 1127 can be located in the portion of glove that does not comprise the outer skin 116 or the inner skin 118.

In some embodiments, movement of the exposed struts 1127 as described can at least partially absorb some of the energy associated with the ball imparting a force to the glove. In some embodiments, movement of the exposed struts 1127 as described can at least partially redirect some of the force imparted to the glove to a central portion of the glove. In some embodiments, movement of the exposed struts 1127 as described can at least partially absorb some of the energy associated to the ball imparting a force to the glove and at least partially redirect some of the force imparted to the glove to a central portion of the glove.

Figure 11A:
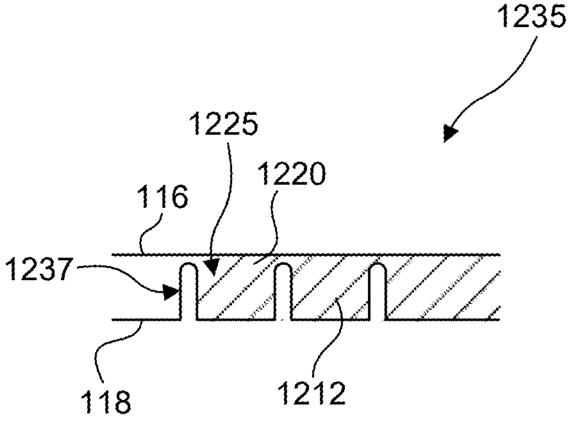
FIGS. 11A-11B show cross-sectional views of a portion of a glove, according to some embodiments.
Figure 11B:
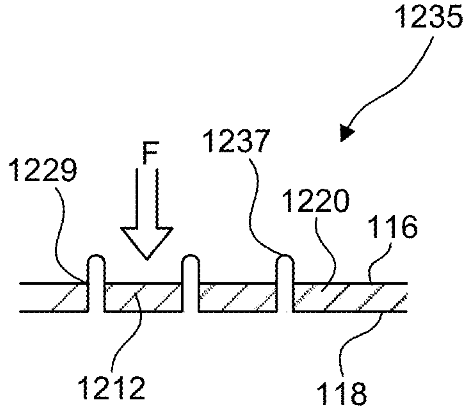

FIGS. 11A-11B show cross-sectional views of a portion 1235 of a glove (for example, any of the gloves previously described, aside from the differences noted herein), according to some embodiments. In some embodiments, the portion 1235 can comprise the outer skin 116, the inner skin 118, and a core 1220 disposed between the outer skin 116 and the inner skin 118 and extending between the outer skin 116 and the inner skin 118. In some embodiments, the portion 1235 can comprise a palm portion of a glove (for example, any of the palm portions previously described, aside from the differences noted herein). In some embodiments, the outer skin 116, the inner skin 118 and the core 1220 can comprise a three-dimensional structure 1225. In some embodiments, the three-dimensional structure 1225 can comprise struts 1212 extending between the outer skin 116 and the inner skin 118. In some embodiments, the struts 1212 can be connected at nodes and define unit cells similar to those described with reference to the unit cells 110, the unit cells 610, the unit cells 710, or the unit cells 1110. In some embodiments, the core 1220 can comprise posts 1237 extending in between the outer skin 116 and the inner skin 118. In some embodiments, the posts 1237 can extend from the inner skin 118 toward the outer skin 116. In some embodiments, the posts 1237 can extend from the outer skin 116 toward the inner skin 118.

In some embodiments, the portion 1235 of the glove can comprise a first configuration (shown in FIG. 11A) and a second configuration (shown in FIG. 11B). In some embodiments, in the first configuration, the core 1220 can be covered by the outer skin 116 or the inner skin 118. In some embodiments, in the second configuration, a portion of the core 1220 can extend through the outer skin 116 or the inner skin 118. In some embodiments, a force F applied to the outer skin 116 (for example, by contact with an object such as a ball) and directed at least partially toward the inner skin 118 can cause the portion 1235 of the glove to move from the first configuration to the second configuration. In some embodiments, the force F can be greater than a threshold value to cause the portion 1235 to move from the first configuration to the second configuration. In some embodiments, when the force F is removed from the outer skin 116, the portion 1235 can move from the second configuration to the first configuration.

In some embodiments, the posts 1237 can extend outside of the outer skin 116 or the inner skin 118 when the portion 1235 is in the second configuration. For example, in some embodiments, the outer skin 116 can define openings 1229 that can be similar to the openings 1129 described with reference to FIG. 10. In embodiments where the posts 1237 can extend from the inner skin 118, the openings 1229 can correspond to the location of the posts 1237 such that the posts 1237 can extend through the openings 1229 in the second configuration and away from the hand of the user. In such embodiments, the glove can comprise different surface textures in the first configuration and the second configuration. For example, in the first configuration, the outer skin 116 can comprise a smooth surface texture. In the second configuration, the posts 1237 extending through the outer skin 116 can cause the glove to have a rough surface texture. In some embodiments, the posts 1237 can at least partially absorb some of the energy imparted to the glove by the force F.

As another example, in some embodiments, the inner skin 118 can define the openings 1229. In embodiments where the posts 1237 can extend from the outer skin 116, the openings 1229 can correspond to the location of the posts 1237 such that the posts 1237 can extend through the openings 1229 in the second configuration and toward the hand of the user. In such embodiments, the glove can comprise different surface textures in the first configuration and the second configuration. For example, in the first configuration, the inner skin 118 can comprise a smooth surface texture. In the second configuration, the posts 1237 extending through the inner skin 118 can cause an inner surface of the glove to have a rough texture. In some embodiments, the posts 1237 can contact the hand of the user in the second configuration to limit relative movement between the glove and the hand of the user.

In some embodiments, any of the gloves described herein that comprise the portion 1235 described in FIGS. 11A-11B can comprise different stiffnesses in the different configurations. In some embodiments, the portion 1235 can comprise a first stiffness in the first configuration and a second stiffness in the second configuration. In some embodiments, the first stiffness can be greater than the second stiffness such that the portion 1235 can become softer when a force is imparted to it. For example, a glove comprising the portion 1235 can become softer upon impact (for example, from an object such as a ball) to absorb at least some of the energy from the impact.

In some instances, embodiments of the present application can comprise features to secure a glove to a hand of a user in such a way as to limit relative motion between the glove and the hand of the user. Limiting relative motion between the glove and the hand of the user can limit instances of the user failing to securely catch or block a ball because an impact force from the ball moved the glove relative to the hand of the user.

Figure 12:
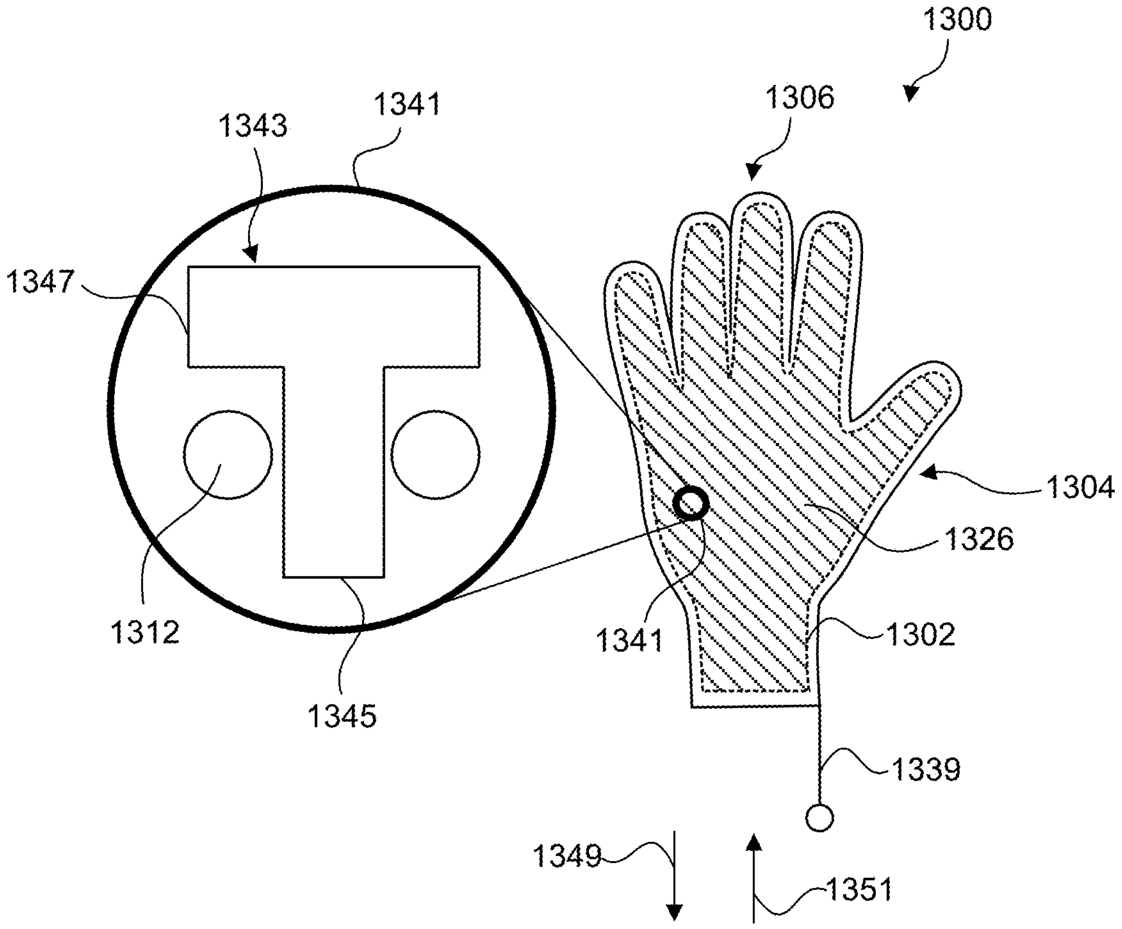
FIG. 12 shows a glove, according to some embodiments.

FIG. 12 shows a glove 1300, according to some embodiments. In some embodiments, the glove 1300 can be similar to any of the gloves previously described, aside from the differences disclosed herein. In some embodiments, the glove 1300 can comprise a wrist portion 1302, a central portion 1304 that comprises a palm portion 1326, and finger portions 1306. In some embodiments, the glove 1300 can comprise the outer skin 116, the inner skin 118, and a core (for example, any of the cores previously described, aside from differences noted herein). In some embodiments, the outer skin 116, the inner skin 118, and the core can be additively manufactured as a single, integral part.

In some embodiments, the glove 1300 can comprise a loose configuration (indicated by the solid lines) and a snug configuration (indicated by the dotted lines). In the loose configuration, the glove 1300 can be donned by the user with little resistance. In the sung configuration, the glove 1300 can be secured to the hand of the user such that relative movement between the glove 1300 and the hand of the user is limited. In some embodiments, the glove 1300 can comprise an adjuster 1339 extending from the glove 1300. In some embodiments, the adjuster 1339 can extend from the outer skin 116. In some embodiments, the adjuster 1339 can extend from the inner skin 118. In some embodiments, the adjuster 1339 can extend from the core.

In some embodiments, the adjuster 1339 is configured to move one or more of the outer skin 116, the inner skin 118, or the core relative to each other to tighten the glove 1300 (to reach the snug configuration) or loosen the glove 1300 (to reach the loose configuration). In some embodiments, the adjuster 1339 can be configured to tighten the glove 1300 when the adjuster 1339 is moved in a tightening direction 1349. In some embodiments, the adjuster 1339 can be configured to loosen the glove 1300 when the adjuster 1339 is moved in a loosening direction 1351. In some embodiments, the adjuster 1339 can be a string that extends from the outer skin 116, the inner skin 118, the core, or a combination thereof. In some embodiments, the adjuster 1339 can be an extension of the outer skin 116, the inner skin 118, the core, or a combination thereof. In some embodiments, the adjuster 1339 can be secured to a portion of the glove 1300 (for example, the wrist portion 1302, the central portion 1304, etc.) to maintain the glove in the snug configuration. For example, in some embodiments, the adjuster 1339 can be secured to the glove 1300 using hook-and-loop connectors.

In some embodiments, the glove 1300 can comprise a three-dimensional mesh 1341. In some embodiments, the three-dimensional mesh 1341 can be similar to other three-dimensional meshes described aside from the differences noted herein. For example, the three-dimensional mesh 1341 can comprise struts 1312. In some embodiments, the three-dimensional mesh 1341 can comprise positioning elements 1343 that are configured to engage with the struts 1312 to change the configuration of the glove 1300. In some embodiments, the positioning elements can comprise shafts 1345 coupled to beams 1347. In some embodiments, as the adjuster 1339 is moved in the tightening direction 1349, the positioning elements 1343 can move in the tightening direction such that the beams 1347 can move between the struts 1312. When the adjuster 1339 stops moving (for example, when the adjustment is complete), the beams 1347 can engage the struts 1312 to limit movement of the positioning elements 1343 in the loosening direction 1351, thereby securing the glove 1300 in the snug configuration. In some embodiments, as the adjuster 1339 is moved in the loosening direction 1351, the positioning elements 1343 can move in the loosening direction 1351 to reverse the movements made when moving to the snug configuration, thereby securing the glove 1300 in the loose configuration.

Figure 13:
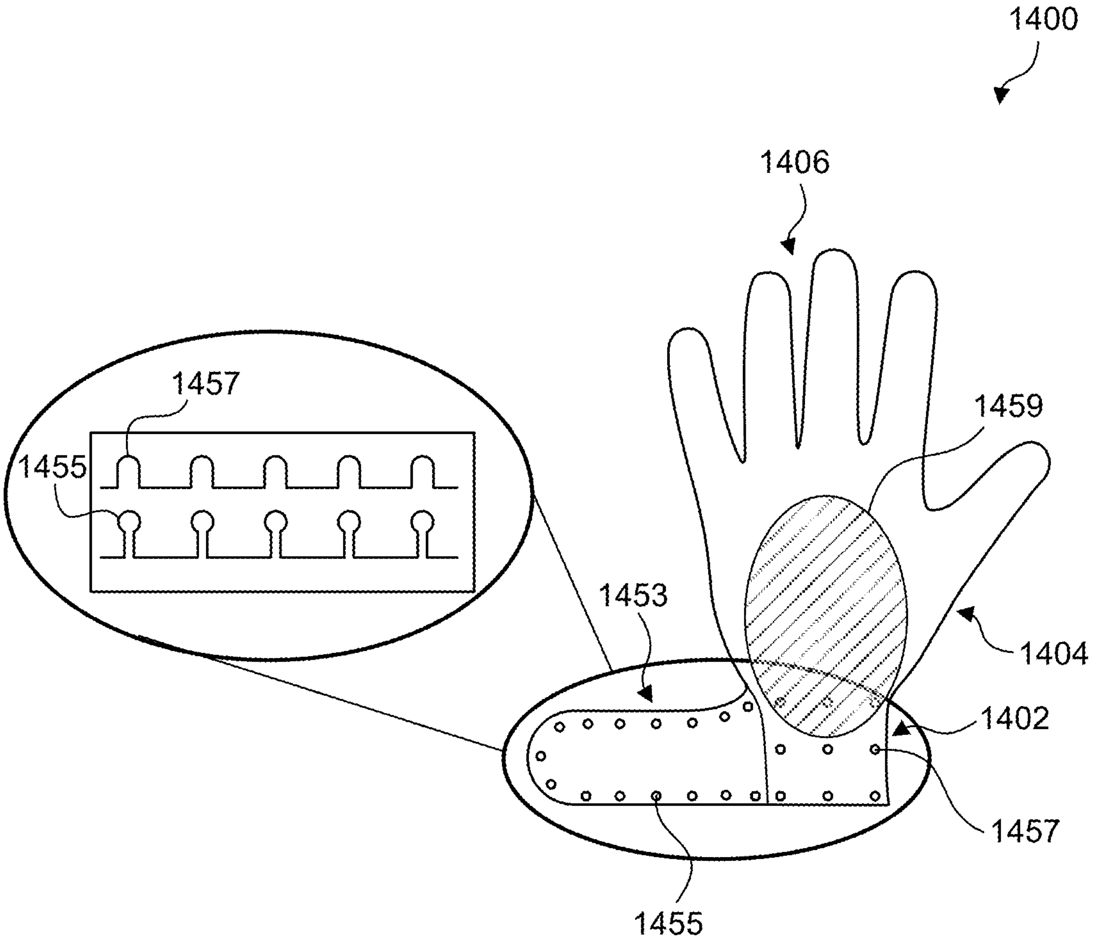
FIG. 13 shows a glove, according to some embodiments.

FIG. 13 shows a glove 1400, according to some embodiments. In some embodiments, the glove 1400 can be similar to any of the gloves previously described, aside from the differences disclosed herein. In some embodiments, the glove 1400 can comprise a wrist portion 1402, a central portion 1404, and finger portions 1406. In some embodiments, the glove 1400 can comprise the outer skin 116, the inner skin 118, and a core (for example, any of the cores previously described, aside from differences noted herein). In some embodiments, the outer skin 116, the inner skin 118, and the core can be additively manufactured as a single, integral part.

In some embodiments, the glove 1400 can comprise an attachment portion 1453 extending from the wrist portion 1402. In some embodiments, the attachment portion 1453 and the wrist portion 1402 can be integrally formed as a single part. In some embodiments, the attachment portion 1453 and the wrist portion 1402 can be additively manufactured.

In some embodiments, the attachment portion 1453 can comprise connectors 1455. In some embodiments, the wrist portion 1402 can comprise connectors 1457. In some embodiments, the connectors 1455 can comprise extensions and the connectors 1457 can comprise recesses configured to receive the connectors 1455. In some embodiments, the connectors 1457 can comprise extensions and the connectors 1455 can comprise recesses configured to receive the connectors 1457.

In some embodiments, the wrist portion 1402 can be tightened or loosened based on engagement between the connectors 1455 and the connectors 1457 to adjust a fit of the glove 1400 around the wrist of the user. For example, a user can tighten or loosen the glove 1400 as desired by aligning the connectors 1455 with the connectors 1457 at the desired tightness and engaging the connectors 1455 with the connectors 1457 to secure the glove 1400 at the desired tightness.

Figure 18:
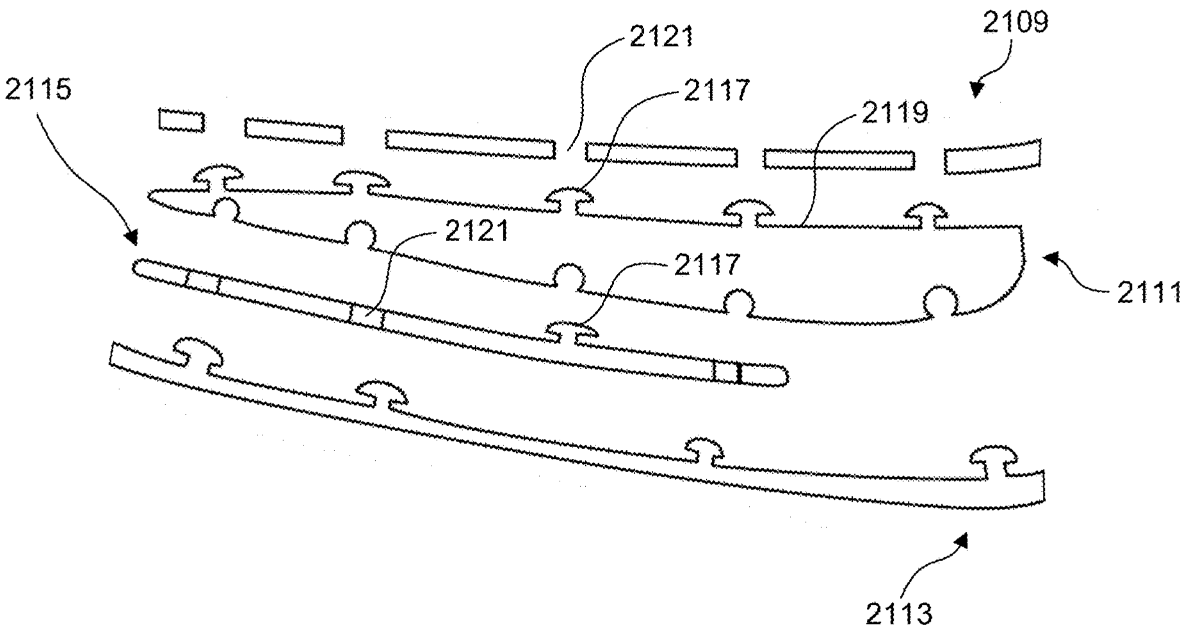
FIG. 18 shows connectors, according to some embodiments.

In some embodiments, a removable component 1459 can be coupled to the glove 1400 using the connectors 1455 and the connectors 1457. In some embodiments, the removable component 1459 can be, for example, a plate, a pad, a panel, a sheet, a slab, a cover, or a textile portion as described herein. For example, the removable component 1459 can be configured to engage with the connectors 1455 and the connectors 1457 such that the removable component 1459 can be used as an intermediate connection between the connectors 1455 and the connectors 1457. In some embodiments, the removable component 1459 can comprise connectors 2117 (as shown in FIG. 18 and described with reference to FIG. 18) that can engage with the connectors 1457 and connectors 2121 (as shown in FIG. 18 and described with reference to FIG. 18) that can engage with the connectors 1455 to secure the removable component 1459 to the glove 1400 and to tighten or loosen the glove 1400 to the desired tightness.

Thus, in some embodiments, at least a portion of the removable component 1459 can be located between the attachment portion 1453 and the wrist portion 1402. In some embodiments, the removable component 1459 can comprise the connectors 2121, and the connectors 1455 can extend through the connectors 2121 and engage with the connectors 1457 to secure the removable component 1459 to the glove 1400. Stated differently, the removable component 1459 can be located and secured between the attachment portion 1453 and wrist portion 1402 based on engagement between the connectors 1455, the connectors 2121, and the connectors 1457.

In some embodiments, the removable component 1459 can comprise a plate that can be stiffer than the glove 1400 to provide support for the hand of the user. In some embodiments, the removable component 1459 can comprise a plate that can have a higher coefficient of friction than the glove 1400 to provide the user with additional grip when handling, for example, a ball. In some embodiments, the removable component 1459 can cover a palm portion of the glove 1400, a back portion of the glove 1400, the finger portions 1406, or a combination thereof.

In some embodiments, the removable component 1459 can be additionally or alternatively coupled to the glove 1400 without using the connectors 1455 or the connectors 1457. For example, the removable component can be coupled to the glove 1400 using connectors described with reference to FIG. 18. More specifically, the removable component 1459 can comprise connectors (for example, one or more of the first connector 2117 and/or one or more of the second connector 2121 as shown in FIG. 18) that engage with respective connectors (for example, one or more of the first connector 2117 and/or one or more of the second connector 2121 as shown in FIG. 18) that can be on various portions of the glove 1400. In some embodiments, the removable component 1459 can be coupled to the central portion 1404 of the glove 1400 (for example, a palm portion). In some embodiments, the removable component 1459 can be coupled to a back portion of the glove 1400, the finger portions 1406, or a combination thereof.

In some instances, embodiments according to the present application can comprise a coating to impart desired properties to the glove.

Figure 14:
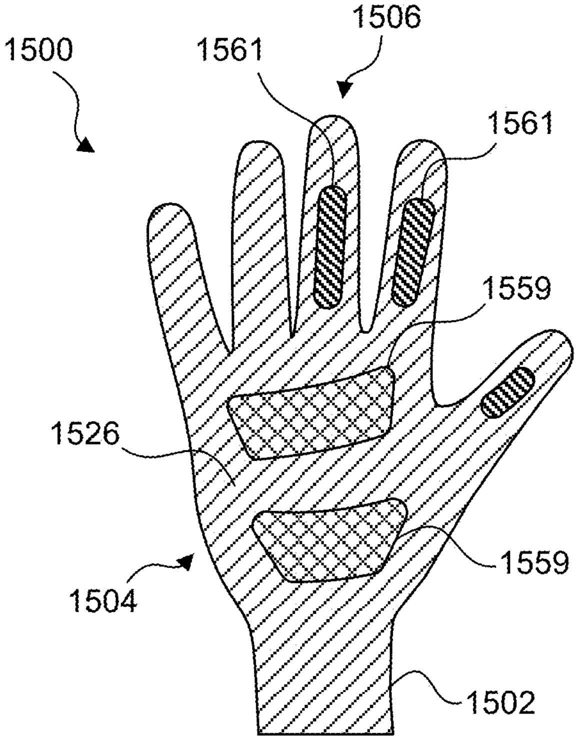
FIG. 14 shows a glove, according to some embodiments.

FIG. 14 shows a glove, according to some embodiments. In some embodiments, the glove 1500 can be similar to any of the gloves previously described, aside from the differences disclosed herein. In some embodiments, the glove 1500 can comprise a wrist portion 1502, a central portion 1504 that comprises a palm portion 1526, and finger portions 1506. In some embodiments, the glove 1500 can comprise the outer skin 116, the inner skin 118, and a core (for example, any of the cores previously described, aside from differences noted herein). In some embodiments, the outer skin 116, the inner skin 118, and the core can be additively manufactured and integrally formed as a single part.

In some embodiments, the outer skin 116 can comprise a coating applied to the outer skin 116 after the curing process is complete. In some embodiments, the coating can be applied by spraying the coating on the glove 1500. In some embodiments, the coating can be applied by brushing the coating on the glove 1500. In some embodiments, the coating can be applied by vacuum forming a sheet of the coating on to the outer skin 116 (for example, in the green state or after being fully cured). In some embodiments, the coating can be applied in specific locations on the glove 1500. For example, palm coatings 1559 can be applied in the palm portion 1526 and finger coatings 1561 can be applied in the finger portions 1506. In embodiments, the palm coatings 1559 and the finger coatings 1561 can be the same thickness. In some embodiments, the palm coatings 1559 and the finger coatings 1561 can be different thicknesses. In some embodiments, the palm coatings 1559 and the finger coatings 1561 can comprise the same material. In some embodiments, the palm coatings 1559 and the finger coatings 1561 can comprise different materials. In some embodiments, the coating can comprise a thermoplastic polyurethane (TPU).

Figure 15:
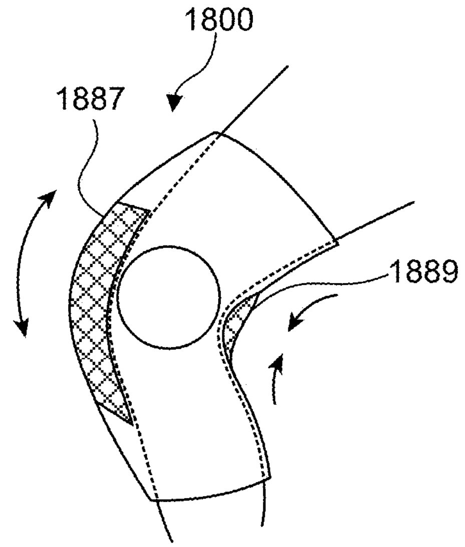
FIG. 15 shows an article of apparel, according to some embodiments.

In some instances, it can be advantageous to manufacture different types of apparel or equipment using the structures and methods described herein. For example, FIG. 15 shows an article of apparel 1800, according to some embodiments. In some embodiments, the article of apparel 1800 can comprise a knee brace. In some embodiments, the article of apparel 1800 can comprise other types of braces (for example, elbow, wrist, shoulder, ankle, etc.). In some embodiments, the article of apparel 1800 can comprise a helmet. In some embodiments, the article of apparel 1800 can comprise an accessory (for example, a backpack, briefcase, or other type of accessory that can be carried). In some embodiments, the article of apparel 1800 can be manufactured using the processes described herein. For example, in some embodiments, the article of apparel 1800 can be manufactured using an additive manufacturing process that can generate the outer skin 116, the inner skin 118, and a core (for example, any of the cores described herein).

In some embodiments, the article of apparel 1800 can comprise different sections that comprise different properties described herein. For example, in some embodiments, the article of apparel 1800 can comprise a first section 1887 and a second section 1889. In some embodiments, the first section 1887 and/or the second section 1889 can expand or contract auxetically during bending of the article of apparel 1800 as described herein for glove 700. In some embodiments, the first section 1887 and/or the second section 1889 can be tightened or loosened as described for glove 1300. In some embodiments, the first section 1887 and/or the second section 1889 can comprise openings to allow for air flow as described for glove 800. In some embodiments, the first section 1887 and/or the second section 1889 can comprise joints or stiffeners to aid with flexion and extension as described for glove 300, glove 400, or glove 500. In some embodiments, the first section 1887 and/or the second section 1889 can comprise a surface texture as described for glove 900.

Figure 16:
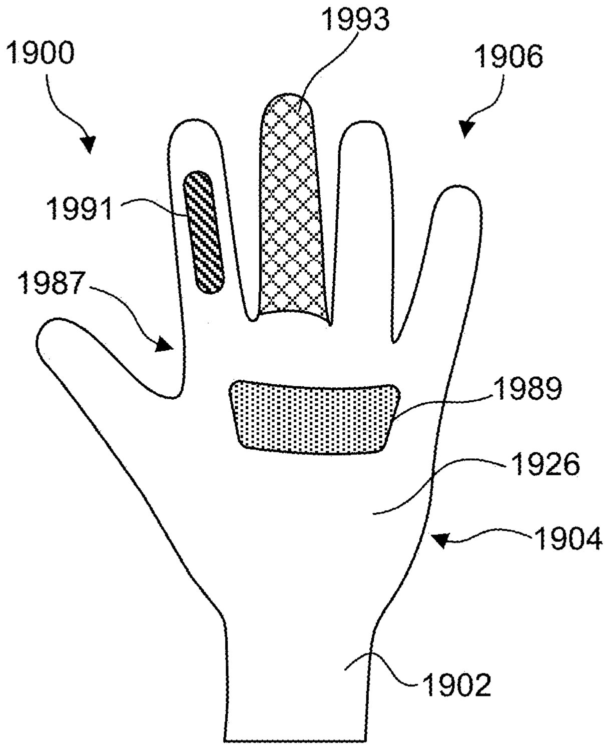
FIG. 16 shows a glove, according to some embodiments.

In some embodiments, any of the gloves described herein can comprise a combination of materials. For example, FIG. 16 shows a glove 1900, according to some embodiments. In some embodiments, the glove 1900 can be similar to any of the gloves previously described, aside from the differences disclosed herein. In some embodiments, the glove 1900 can comprise a wrist portion 1902, a central portion 1904 that comprises a palm portion 1926, and finger portions 1906. In some embodiments, the glove 1900 can comprise the outer skin 116, the inner skin 118, and a core (for example, any of the cores previously described).

In some embodiments, the glove 1900 can comprise a combination of textile portions and additively manufactured portions. For example, the glove 1900 can comprise one or more textile portions 1987. In some embodiments, a textile portion 1987 can comprise at least a portion of the central portion 1904, at least a portion of the wrist portion 1902, at least a portion of the finger portions 1906, or a combination thereof.

In some embodiments, the glove 1900 can comprise one or more additively manufactured portions (for example, portions that can comprise a three-dimensional mesh as described herein). For example, the glove 1900 can comprise a first additively manufactured portion 1989, a second additively manufactured portion 1991, and a third additively manufactured portion 1993. In some embodiments, the first additively manufactured portion 1989, the second additively manufactured portion 1991, and the third additively manufactured portion 1993 can comprise similar properties (for example, similar stiffnesses, similar densities, similar surface textures, etc.). In some embodiments, one or more of the first additively manufactured portion 1989, the second additively manufactured portion 1991, and the third additively manufactured portion 1993 can comprise different properties.

In some embodiments, the first additively manufactured portion 1989, the second additively manufactured portion 1991, the third additively manufactured portion 1993, or a combination thereof can be coupled with textile portion 1987, for example via an adhesive. In some embodiments, the textile portion 1987 can comprise one or more pouches configured to receive the first additively manufactured portion 1989, the second additively manufactured portion 1991, the third additively manufactured portion 1993, or a combination thereof. In some embodiments, the textile portion 1987 can comprise connectors (for example, a hook-and-loop connector, a recess, a protrusion, etc.) configured to receive corresponding connectors of the first additively manufactured portion 1989, the second additively manufactured portion 1991, the third additively manufactured portion 1993, or a combination thereof.

Though the first additively manufactured portion 1989, the second additively manufactured portion 1991, and the third additively manufactured portion 1993 are shown in specific locations on the textile portion 1987, the first additively manufactured portion 1989, the second additively manufactured portion 1991, and the third additively manufactured portion 1993 can be located anywhere on the glove 1900. Additionally, though three additively manufactured portions are shown on FIG. 16, more or fewer additively manufactured portions can be implemented.

Additively manufactured portion(s) 1989, 1991, 1993 can comprise one or more features of glove 300, glove 400, glove 500, glove 600, glove 700, glove 800, glove 900, glove 1000, glove 1300, glove 1400, and/or glove 1500. In some embodiments, additively manufactured portion(s) 1989, 1991, 1993 can additionally or alternatively comprise one or more portions 1123 as described in connection with FIG. 10, one or more portions 1235 as described in connection with FIGS. 11A-11B, or a combination thereof. For example, additively manufactured portion(s) 1989, 1991, 1993 comprise unit cells that expand or contract auxetically as described herein for glove 700, an adjuster for tightening or loosening the glove 100 as described for glove 1300, openings to allow for air flow as described for glove 800, joints or stiffeners to aid with flexion and extension as described for glove 300, glove 400, or glove 500, and/or a surface texture as described for glove 900.

In some embodiments, the textile portion(s) 1987 can comprise one or more textile materials. In some embodiments, the textile material can be a non-woven, woven, braided, or knitted fabric material. Exemplary fabric materials comprise, but are not limited to, thermoplastic polyurethane (TPU), polyester, polyamide, polyethylene (PE), PE foam, polyurethane (PU) foam, nylon, ultra-high molecular weight polyethylene (for example, DYNEEMA® (a type of ultra-high molecular weight polyethylene)), carbon fiber, KEVLAR® (a type of para-aramid), synthetic spider silk, cotton, wool, natural or artificial silk, polyethersulfone (PES), ELASTAN® (a polyether-polyurea copolymer), or a blend of two or more of these materials. In some embodiments, the textile material can be a polymeric sheet or film, for example, a TPU sheet or film. In some embodiments, the textile material can be a mesh material.

Figure 17:
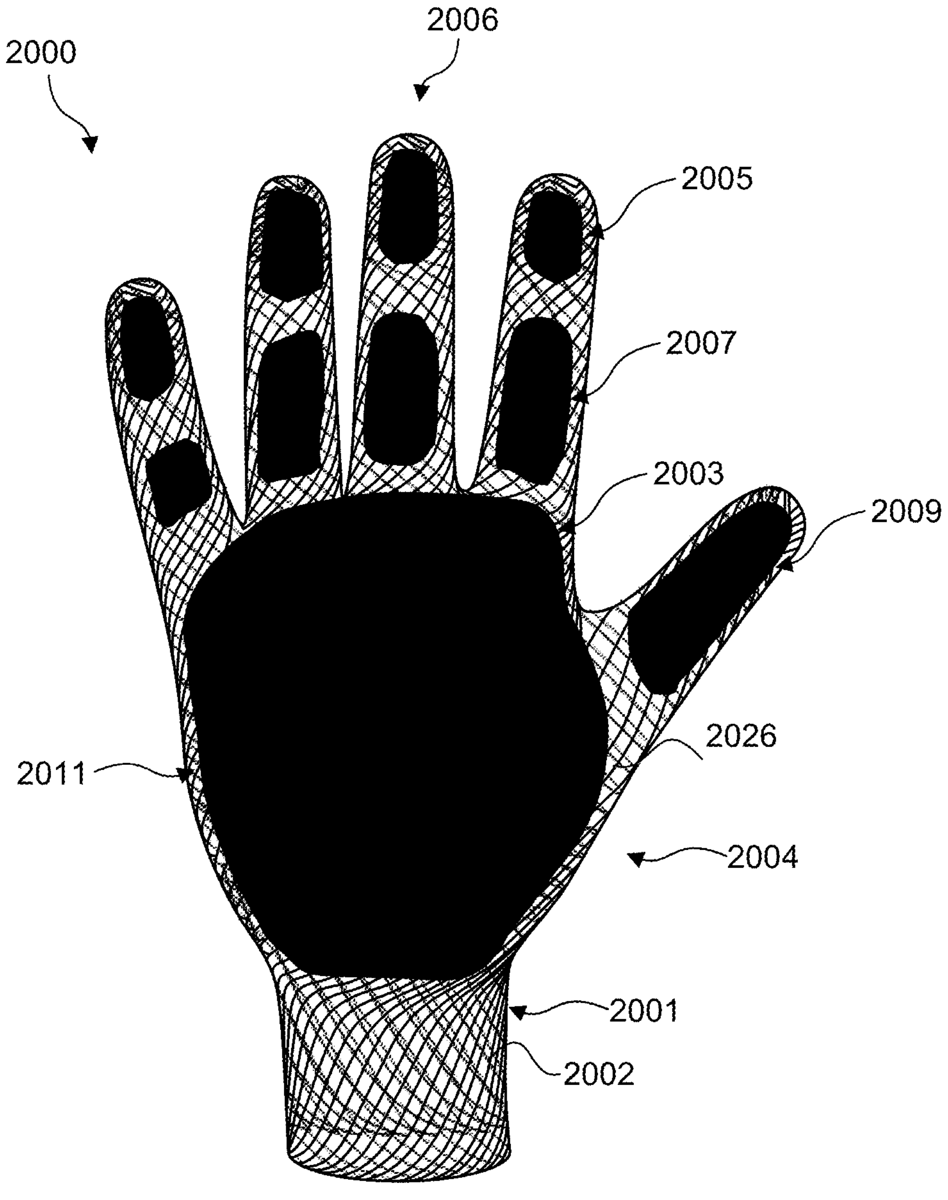
FIG. 17 shows a glove, according to some embodiments.

FIG. 17 shows a glove 2000, according to some embodiments. In some embodiments, the glove 2000 can be similar to any of the gloves previously described, aside from the differences disclosed herein. In some embodiments, the glove 2000 can comprise a wrist portion 2002, a central portion 2004 that comprises a palm portion 2026, and finger portions 2006. In some embodiments, the glove 2000 can comprise the outer skin 116, the inner skin 118, and a core (for example, any of the cores previously described).

In some embodiments, the glove 2000 can comprise a combination of additively manufactured portions 2001 (for example, the wrist portion 2002 and the central portion 2004) and one or more non-additively manufactured portions 2003 (for example, textile portions similar to the textile portions 1987 shown in FIG. 16, rubber portions, etc.). In some embodiments, the one or more non-additively manufactured portions 2003 can comprise fingertip portions 2005, lower finger portions 2007, a thumb portion 2009, a palm portion 2011, or a combination thereof. In some embodiments, the additively manufactured portions 2001 can comprise a lattice structure as described with reference to FIGS. 1A-1B and the one or more non-additively manufactured portions 2003 can comprise a solid structure (for example, a non-porous structure). In some embodiments, the one or more non-additively manufactured portions 2003 can comprise a higher coefficient of friction than the additively manufactured portions 2001. In such embodiments, the one or more non-additively manufactured portions 2003 can slow or stop an object such as a ball faster than the additively manufactured portions 2001.

In some embodiments, the one or more non-additively manufactured portions 2003 can be coupled to the additively manufactured portions 2001 in various locations. For example, the one or more non-additively manufactured portions 2003 can be coupled to the additively manufactured portions 2001 at, for example, the palm portion 2026. As another example, the one or more non-additively manufactured portions 2003 can be coupled to the additively manufactured portions 2001 at, for example, the finger portions 2006. In some embodiments, the one or more non-additively manufactured portions 2003 can be coupled to the finger portions 2006 at discrete locations (for example, the fingertips 2005, lower finger portions 2007, etc.) such that the one or more non-additively manufactured portions 2003 can be discontinuous on the finger portions 2006. In some embodiments, the one or more non-additively manufactured portions 2003 can be coupled to the palm portion 2026 at discrete locations (for example, at an upper palm portion, a lower palm portion, etc.) such that the one or more non-additively manufactured portions 2003 can be discontinuous on the palm portion 2026.

In some embodiments, the one or more non-additively manufactured portions 2003 can be coupled to the additively manufactured portions 2001 such that the one or more non-additively manufactured portions 2003 can extend continuously along the finger portions 2006 and the palm portion 2026, and continuously between the finger portions 2006 and the palm portion 2026.

In some embodiments, the one or more non-additively manufactured portions 2003 can be coupled to the additively manufactured portions 2001 at an inner portion of the glove 2000 instead of an outer portion of the glove 2000. For example, the one or more non-additively manufactured portions 2003 can be coupled to the inner portion of the glove 2000 such that the one or more non-additively manufactured portions 2003 contact the hand of the user when the glove 2000 is being worn. Such embodiments may limit slipping of the glove 2000 relative to the skin of the user.

In some embodiments, some of the one or more non-additively manufactured portions 2003 can be located on the inner portion of the glove 2000 and some of the one or more non-additively manufactured portions 2003 can be located on the outer portion of the glove 2000. Such embodiments may limit slipping of the glove 2000 relative to the skin of the user and limit slipping of an object (such as a ball) relative to the glove 2000.

In some embodiments, the one or more non-additively manufactured portions 2003 can be coupled to the additively manufactured portions 2001 using connectors (for example, the connectors described with reference to FIG. 18). In some embodiments, the one or more non-additively manufactured portions 2003 can be coupled to the additively manufactured portions 2001 using, for example, one or more adhesives. In some embodiments, the one or more non-additively manufactured portions 2003 can be coupled to the additively manufactured portions 2001 using stitching (for example, the one or more non-additively manufactured portions 2003 can be sewn on to the additively manufactured portions 2001). In some embodiments, the one or more non-additively manufactured portions 2003 can be sprayed on to the additively manufactured portions 2001 (for example, via an aerosol or non-aerosol based spraying process).

In some embodiments, the one or more non-additively manufactured portions 2003 can comprise two or more materials disposed at different parts of the glove 2000. For example, the non-additively manufacture portions 2003 can comprise a textile material disposed at the palm portion 2026 and a rubber material at the finger portions 2006. Additional materials that can be implemented include one or more of latex, polyurethane (for example, polyurethane foam, silicone, leather, etc.).

In some embodiments, the additively manufactured portions 2001 can comprise a solid surface in one or more locations of the glove 2000 (for example, instead of comprising a lattice structure at an outer surface). In such embodiments, the one or more non-additively manufactured portions 2003 can be omitted in the locations where the additively manufactured portions 2001 comprise a solid surface. For example, the additively manufactured portion 2001 can comprise a solid surface at the outer surface of the palm portion 2026 such that the one or more non-additively manufactured portions 2003 can be omitted at the palm portion 2026. As another example, the additively manufacture portions 2001 can comprise a solid surface at the outer surface of the finger portions 2006 such that the one or more non-additively manufactured portions 2003 can be omitted at the finger portions 2006.

FIG. 18 shows connectors for coupling different components, according to some embodiments. The connectors shown in FIG. 18 can be used to couple components of various embodiments of gloves described herein. For example, the connectors described with reference to FIG. 18 can be used to couple components described with reference to FIGS. 3A, 3B, 13, 14, 16, and 17.

As shown in FIG. 18, a first component 2109, a second component 2111, a third component 2113, and a fourth component 2115 can be configured to couple to each other using various connectors. The first component 2109, the second component 2111, the third component 2113, and the fourth component 2115 are shown for illustrative purposes and the number of these components does not imply that the gloves disclosed herein require all use of all components. For example, the gloves disclosed herein can comprise two or more of the first component 2109, the second component 2111, the third component 2113, or the fourth component 2115. In some embodiments, the first component 2109, the second component 2111, the third component 2113, and the fourth component 2115 can be portions of an article of apparel (for example, a glove). In some embodiments, one or more of the first component 2109, the second component 2111, the third component 2113, or the fourth component 2115 can be additively manufactured. In some embodiments, at least one of the first component 2109, the second component 2111, the third component 2113, or the fourth component 2115 can be a different material. For example, the fourth component 2115 can be a different material than the materials of the first component 2109, the second component 2111, and the third component. In some embodiments, the different material can be stiffer or stronger than the other materials to provide additional support for the other components.

In some embodiments, the second component 2111 can comprise a first connector 2117 that can couple the second component 2111 to the first component 2109. In some embodiments, the second component 2111 can comprise a second connector 2121 that can coupled the second component to the third component 2113 and/or the fourth component 2115. In embodiments where the second component 2111 is additively manufactured, the first connector 2117 can be integrally formed with the second component 2111. Thus, the first connector 2117 and the second component 2111 can form a seamless structure with a continuous transition between the second component 2111 and the first connector 2117. In some embodiments, the first connector 2117 can extend from an upper surface 2119 of the second component 2111 toward the first component 2109.

In some embodiments, the first component 2109 can comprise a second connector 2121 that can couple the second component 2111 to the first component 2109. The second connector 2121 can be integrally formed with the first component 2109 and can form a seamless structure with a continuous transition between the first component 2109 and the second connector 2121. In some embodiments, the second connector 2121 can be an aperture extending entirely through the first component 2109 and can be sized to receive the first connector 2117. In some embodiments, the second connector 2121 can be an aperture extending partially through the first component 2109 and can be sized to receive the first connector 2117. For example, the second connector 2121 can be a pocket or slot sized to receive the first connector 2117.

In some embodiments, the first connector 2117 can engage the second connector 2121 to connect the first component 2109 and the second component 2111. For example, the first connector 2117 can extend into the second connector 2121 to draw the first component 2109 and the second component 2111 closer to each other to connect the first component 2109 and the second component 2111. In some embodiments, the first connector 2117 can engage the second connector 2121 via a press fit, friction fit, or any other type of fit in which a dimensional mismatch causes one or both of the connectors to deform during engagement.

In some embodiments, the relative positions of the first connector 2117 and the second connector 2121 can be reversed. For example, the first connector 2117 can be integrally formed with the first component 2109 and extend toward the second component 2111. Similarly, the second connector 2121 can be integrally formed with the second component 2111 and can be recessed from (for example, extend away from) the first component 2109.

In some embodiments, the first component 2109 can comprise a plurality of the first connector 2117 and the second component 2111 can comprise a plurality of the second connector 2121. In some embodiments, the first component 2109 can comprise a plurality of the second connector 2121 and the second component 2111 can comprise a plurality of the first connector 2117. In some embodiments, the first component 2109 can comprise at least one of the first connector 2117 and at least one of the second connector 2121, and the second component 2111 can comprise a corresponding at least one of the second connector 2121 and at least one of the first connector 2117 to engage the respective connectors of the first component 2109.

In some embodiments, the third component 2113 can couple to the second component 2111 in a manner similar to that described with respect to the connection between the second component 2111 and the first component 2109.

In some embodiments, the fourth component 2115 can be located between the second component 2111 and the third component 2113. In some embodiments, the fourth component 2115 can comprise one or more of the first connector 2117 and/or one or more of the second connector 2121. In some embodiments, the one or more of the first connector 2117 and the one or more of the second connector 2121 can be integrally formed with the fourth component 2115. In such embodiments, the fourth component 2115 can be coupled to the second component 2111 and the third component 2113 based on engagement between the respective connectors of the second component 2111, the third component 2113, and the fourth component 2115.

In some embodiments, any of the gloves described herein can have a personalized fit for the user. In some embodiments, the hand of the user can be scanned (for example, using a three-dimensional scanning technology) to generate a three-dimensional computer model of the hand of the user. Any of the gloves described herein can subsequently be manufactured (for example, using an additive manufacturing process) based on the three-dimensional computer model for a personalized fit for a specific user.

In some embodiments, any of the gloves described herein can comprise more lattice portions in addition to lattice portions that can comprise the wrist portion, the central portion, and the finger portions. For example, any of the gloves described herein can comprise one or more additional lattice portions between the finger portions. In such embodiments, the finger portions can look webbed. As an additional example, any of the gloves described herein can comprise one or more additional lattice portions that can provide support for the glove during the additive manufacturing process, and can the additional lattice portions be removed after curing from the green state.

While various embodiments have been described herein, they have been presented by way of example, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but can be interchanged to meet various situations as would be appreciated by one of skill in the art.

The examples are illustrative, but not limiting, of the present disclosure. Other suitable modifications and adaptations of the variety of conditions and parameters normally encountered in the field, and which would be apparent to those skilled in the art, are within the spirit and scope of the disclosure.

It is to be understood that the phraseology or terminology used herein is for the purpose of description and not of limitation. The breadth and scope of the present disclosure should not be limited by any of the above-described exemplary embodiments, but should be defined in accordance with the following claims and their equivalents.

What is claimed is:

1. An article of apparel, comprising:

an outer skin;

an inner skin; and a core disposed between the outer skin and the inner skin and extending from the inner skin and toward the outer skin, wherein the article of apparel comprises a first configuration in which the core is covered by the outer skin and a second configuration in which a portion of the core extends through the outer skin or the inner skin.

2. The article of apparel of claim 1, wherein a force applied to the outer skin and directed at least partially toward the inner skin causes the article of apparel to move from the first configuration to the second configuration when the force is greater than a threshold value.

3. The article of apparel of claim 1, wherein the core comprises posts extending from the inner skin, and wherein the outer skin defines openings corresponding to the posts such that the posts extend through the openings in the second configuration.

4. The article of apparel of claim 1, wherein the core comprises posts extending from the outer skin, and wherein the inner skin defines openings corresponding to the posts such that the posts extend through the openings in the second configuration.

* * * * *